US011025287B1

(12) United States Patent
Jensen

(10) Patent No.: US 11,025,287 B1
(45) Date of Patent: Jun. 1, 2021

(54) INTERFERENCE CANCELLATION SYSTEM

(71) Applicant: Rockwell Collins, Inc., Cedar Rapids, IA (US)

(72) Inventor: Dana J. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/792,350

(22) Filed: Feb. 17, 2020

Related U.S. Application Data

(62) Division of application No. 16/130,344, filed on Sep. 13, 2018, now Pat. No. 10,567,021.

(51) Int. Cl.
*H04B 1/12* (2006.01)
*H04B 1/10* (2006.01)

(52) U.S. Cl.
CPC ........... *H04B 1/126* (2013.01); *H04B 1/1018* (2013.01); *H04B 1/1036* (2013.01); *H04B 1/1081* (2013.01)

(58) Field of Classification Search
CPC .... H04B 1/126; H04B 1/1018; H04B 1/1036; H04B 1/1081
See application file for complete search history.

(56) References Cited

U.S. PATENT DOCUMENTS

| 5,107,273 A * | 4/1992 | Roberts ................ H01Q 3/2611 342/375 |
|---|---|---|
| 2002/0086640 A1 | 7/2002 | Belcher et al. |
| 2009/0011704 A1* | 1/2009 | Karabinis .......... H04B 7/18534 455/13.4 |
| 2009/0040107 A1 | 2/2009 | Yun et al. |
| 2012/0252392 A1 | 10/2012 | Wilkerson et al. |

OTHER PUBLICATIONS

Non-Final Office Action for U.S. Appl. No. 16/130,344, dated Jun. 21, 2019, 8 pages.
Notice of Allowance for U.S. Appl. No. 16/130,344, dated Oct. 21, 2019, 5 pages.

* cited by examiner

*Primary Examiner* — Nguyen T Vo
(74) *Attorney, Agent, or Firm* — Suiter Swantz pc llo

(57) ABSTRACT

Embodiments of the inventive concepts disclosed herein are directed to a system for cancelling interference. The system may include a first antenna and a second antenna spatially separated from the first antenna. The system may include a first time delay unit, coupled to the first antenna, and configured to apply a first time delay and first power gain on a first signal received by the first antenna. The system may include a control circuit, coupled to the first time delay unit, and configured to determine the first time delay and first power gain to cause a modified version of the first signal and a second signal, received by the second antenna, to be aligned in time and power levels.

13 Claims, 16 Drawing Sheets

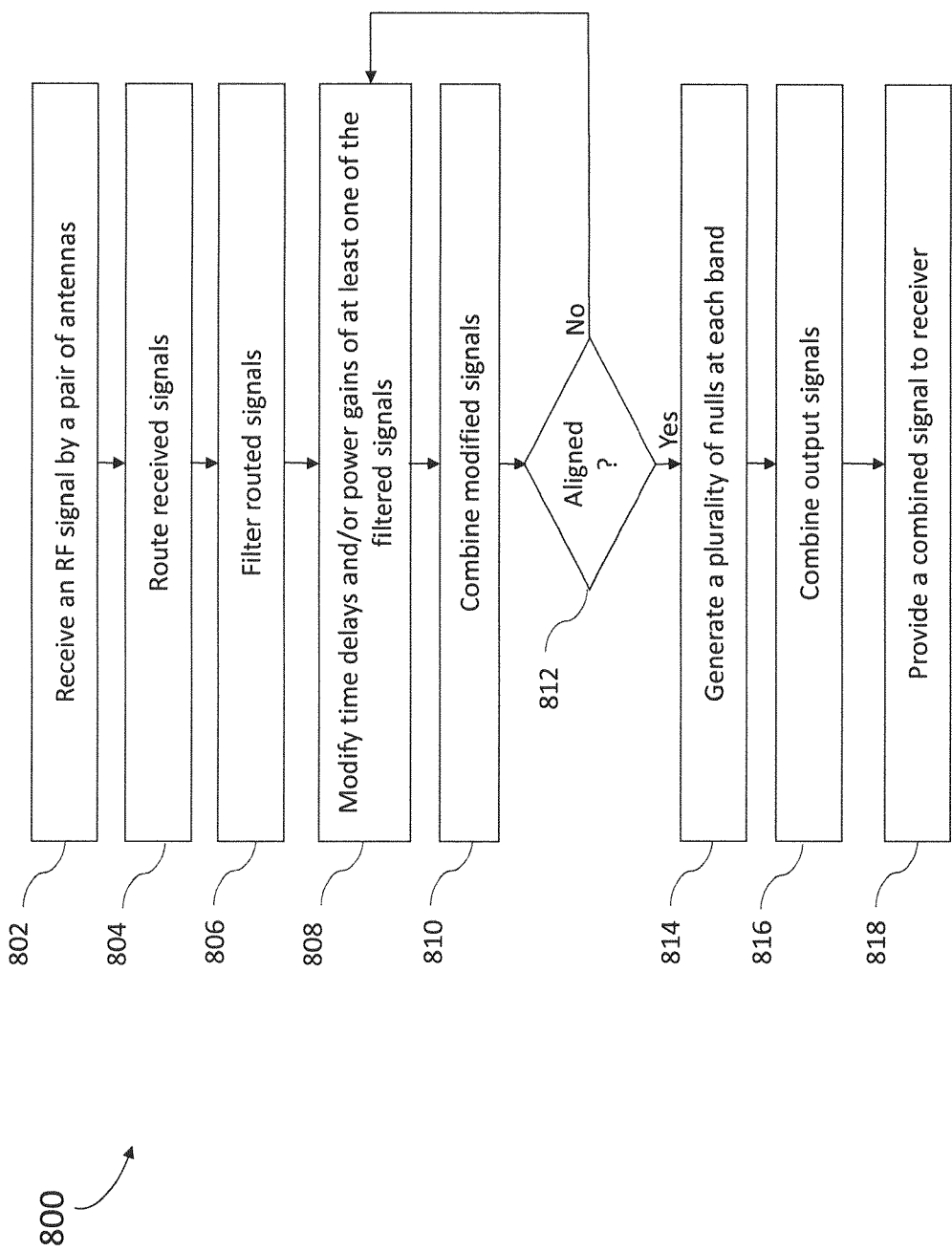

INTERFERENCE CANCELLATION SYSTEM

CROSS-REFERENCE TO RELATED PATENT APPLICATIONS

This application is a divisional of U.S. application Ser. No. 16/130,344, filed Sep. 13, 2018, which is hereby incorporated by reference herein in its entirety.

GOVERNMENT LICENSE RIGHTS

This invention was made with government support under DOTC-16-01/W15QKN-14-9-1001 and DOTC-16-01-INIT0266-RC-01 awarded by the Department of Defense Ordnance Technology Consortium. The government has certain rights in the invention.

BACKGROUND

Radio frequency (RF) communication systems can be utilized in various environments. Interferences may occur in such RF systems and may interrupt, obstruct, or otherwise degrade or limit the effective performance of the communication. Various interferences can occur in an RF communication system such as, for example, co-site interferences, self-interferences, self-network interferences, and intentional interferences (or sometimes referred to as jammer interferences).

SUMMARY

In one aspect, embodiments of the inventive concepts disclosed herein are directed to a system for cancelling interference. The system may include a first antenna and a second antenna spatially separated from the first antenna. The system may include a first time delay unit, coupled to the first antenna, and configured to apply a first time delay and first power gain on a first signal received by the first antenna. The system may include a control circuit, coupled to the first time delay unit, and configured to determine the first time delay and first power gain to cause a modified version of the first signal and a second signal, received by the second antenna, to be aligned in time and power levels.

In another aspect, embodiments of the inventive concepts disclosed herein are directed to a system for automatically cancelling interference. The system may include a first antenna and a second antenna spatially separated from the first antenna. The system may include a first time delay unit configured to apply a first time delay and first power gain on a first signal received by the first antenna to provide a modified version of the first signal. The system may include a second time delay unit configured to apply a second time delay and second power gain on a second signal received by the second antenna to provide a modified version of the second signal. The system may include a first subtractor configured to subtract respective power levels of the modified version of the first signal and the modified version of the second signal to provide a first output signal. The system may include a first control circuit configured to determine the first and second time delays and first and second power gains based on a power level of the first output signal to cause the modified version of the first signal and the modified version of the second signal to be aligned in time and power levels.

In yet another aspect, embodiments of the inventive concepts disclosed herein are directed to a system for automatically cancelling interference. The system may include a first antenna and a second antenna spatially separated from the first antenna. The system may include a first time delay unit configured to apply a first time delay and first power gain on a first signal received by the first antenna to provide a first modified version of the first signal. The system may include a second time delay unit configured to apply a second time delay and second power gain on a second signal received by the second antenna to provide a first modified version of the second signal. The system may include a third time delay unit configured to apply a third time delay and third power gain on the first signal received by the first antenna to provide a second modified version of the first signal. The system may include a fourth time delay unit configured to apply a fourth time delay and fourth power gain on the second signal received by the second antenna to provide a second modified version of the second signal. The system may include a first subtractor configured to subtract respective power levels of the first modified version of the first signal and the first modified version of the second signal to provide a first output signal. The system may include a first control circuit configured to determine the first and second time delays and first and second power gains based on a power level of the first output signal to cause the first modified version of the first signal and the first modified version of the second signal to be aligned in time and power levels. The system may include a second subtractor configured to subtract respective power levels of the second modified version of the first signal and the second modified version of the second signal to provide a second output signal. The system may include a second control circuit configured to determine the third and fourth time delays and third and fourth power gains based on a power level of the second output signal to cause the second modified version of the first signal and the second modified version of the second signal to be aligned in time and power levels.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 8 shows a flow chart of an exemplary method to operate the RF communication systems of FIG. 3, in accordance with some embodiments of the inventive concepts disclosed herein;

DETAILED DESCRIPTION

Figure 1A:
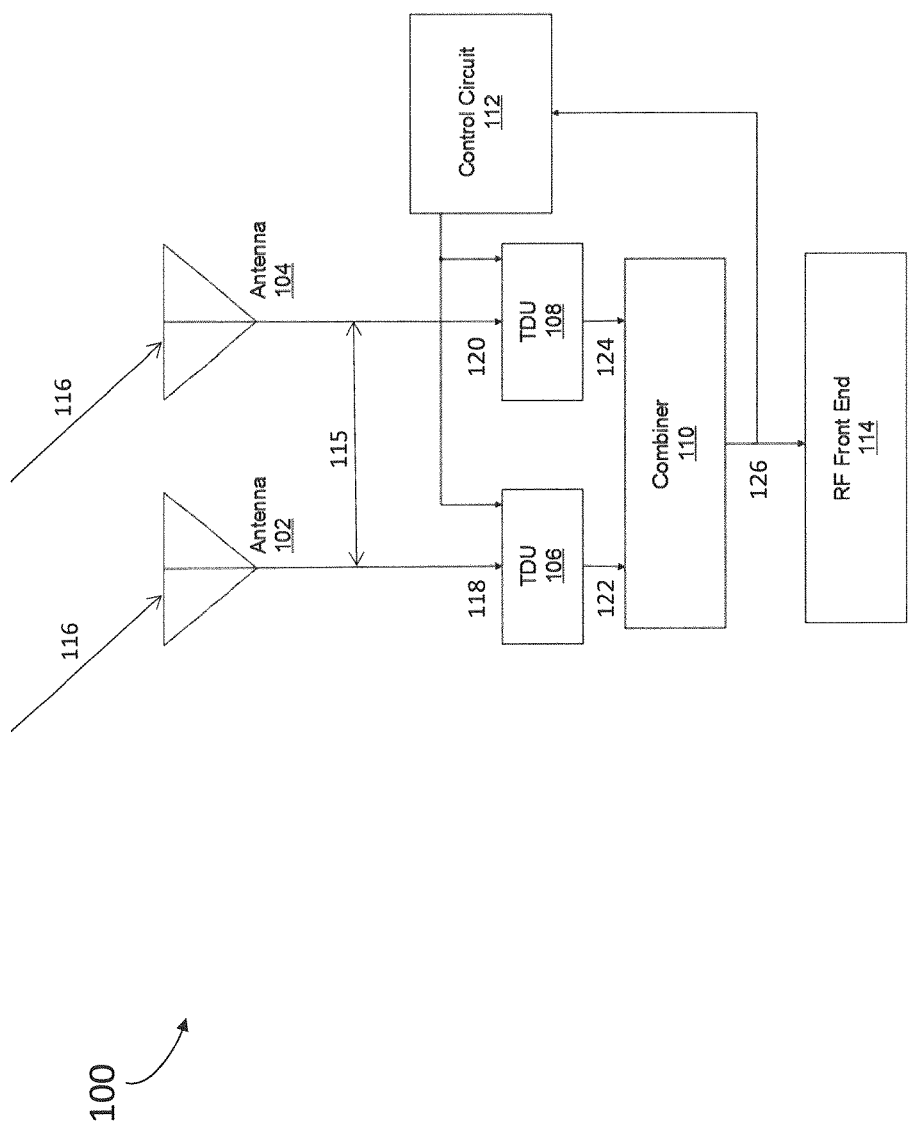
FIG. 1A is a block diagram of an RF communication system, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

The present disclosure provides various embodiments of systems and methods to cancel the above-mentioned interferences. In some embodiments, an RF communication system and a method to operate the same are disclosed. The RF communication system can include a pair of antennas. At least a first one of the pair of antennas can be coupled by a time delay unit that can apply dynamically configurable, adjustable, or determined time delays and power gains on a signal received by the first antenna. A second one of the pair of antennas can be coupled by no such a time delay, another time delay unit that can also apply dynamically configurable, adjustable, or determined time delays and power gains on a signal received by the second antenna, or yet another time delay unit that can apply a fixed time delay and power gain on the signal received by the second antenna. In some embodiments, the dynamically configurable, adjustable, or determined time delays and power gains, respectively applied on the signals received by first and second antennas, can be determined by a control circuit through monitoring or measuring whether such modified (e.g., delayed in time and amplified in power) signals can be aligned in time and power levels. In response to determining that the two modified signals are aligned in time and power levels, the RF communication system can provide one or more nulls against an interference based on the time delays and power gains respectively applied on the signals received by the first and second antennas.

For purposes of reading the description of the various embodiments below, the following descriptions of the sections of the specification and their respective contents may be helpful:

Section A describes various embodiments of an RF communication system.

Section B describes exemplary methods to respectively operate the RF communication systems described in Section A.

Section C describes nulls and/or aliased nulls generated by the RF communications systems described in Section A.

A. RF Communication System

Referring to FIG. 1A, depicted is a functional block diagram of an RF communication system 100. As shown in FIG. 1A, the RF communication system 100 includes a first antenna 102, a second antenna 104, a first time delay unit (TDU) 106, a second TDU 106, a combiner 110, a control circuit 112, and an RF front end 114. The components 102-114 shown in the illustrated embodiment of FIG. 1A may constitute a portion of the RF communication system 100, which can further include any of various other RF communication components such as, for example, one or more digital baseband processing subsystems, one or more digital-to-analog processing subsystems, one or more transmitting subsystems, etc., while remaining within the scope of the present disclosure. Such subsystems shall be discussed with respect to FIGS. 5A-B.

In some embodiments, the TDU 106 can be coupled to the antenna 102, and the TDU 108 can be coupled to the antenna 104. The antennas 102 and 104, physically separated apart from each other by a distance 115, can receive one or more RF signals e.g., signal 116. Depending on the directions along which the antennas 102 and 104 receive the one or more RF signals 116, signals 118 and 120 respectively received through or by the antennas 102 and 104 (sometimes respectively referred to as "received signal 118" and "received signal 120") can be different, e.g., presenting a phase difference therebetween. Such a phase difference may be associated with a propagation delay between the antennas 102 and 104. The TDU 106 can apply dynamically configurable, adjustable, or determined time delays and power gains on the received signal 118 to provide a modified version of the received signals 118 (sometimes respectively referred to as "modified signal 122"); and the TDU 108 can apply dynamically configurable, adjustable, or determined time delays and power gains on the received signal 120 to provide a modified version of the received signals 120 (sometimes respectively referred to as "modified signal 122").

Each of the TDUs 106 and 108 can include one or more components to apply the time delay and power gain on the received signal. In some embodiments, the TDU can include one or more true time delay (TTD) devices/units, at least one of which can provide an adjustable, a variable, or programmable time delay, and one or more amplifiers or attenuators, at least one of which can provide an adjustable, a variable, or programmable power gain, or gain. As shall be discussed below, respective values of such adjustable time delays and power gains may be determined by the control circuit 112.

The combiner 110 is coupled to the TDUs 106 and 108 to receive the modified signals 122 and 124. In some embodiments, the combiner 110 can be a 180° hybrid combiner, which can perform a subtraction function on the modified signals 122 and 124. In response to receiving the modified signals 122 and 124, the combiner 110 can perform a subtraction function on the modified signals 122 and 124 to provide an output signal 126 to the control circuit 112 and RF front end 114. In the case where the modified signals 122 and 124 are aligned in time and power levels (by the TDUs 106 and 108, respectively), the combiner 110 can provide the output signal 126 as one or more nulls, which may be used to minimize or eliminate interferences that can be included within the one or more RF signals 116. Such a null shall be discussed in further detail below with respect to FIGS. 9A-B.

The control circuit 112 can use the output signal 126, received from the combiner 110, to determine the time delay and power gain that the TDU 106 applies on the received signal 118, and provide the determined time delay and power gain to the TDU 106. Similarly, the control circuit 112 can use the output signal 126, received from the combiner 110, to determine the time delay and power gain that the TDU 108 applies on the received signal 118, and provide the determined time delay and power gain to the TDU 108.

In some embodiments, the control circuit 112 can determine a power level of the output signal 126, and based on the power level of the output signal 126 to determine the time delays and power gains respectively used by the TDUs 106 and 108. For example, the control circuit 112 can iteratively update the time delays and/or power gains that the TDUs 106 and 108 respectively use on the received signals 106 and 108 based on the power level of the output signal 126. In some embodiments, the control circuit 112 can determine the respective time delays and power gains respectively used by the TDUs 106 and 108 to cause the combiner 110 to provide the output signal 126 as one or more nulls, responsive to determining that the corresponding power level of the output signal 126 is a minimum over plural iterations of updating the time delays and/or power gains (used by the TDUs 106 and 108, respectively). Such a null shall be discussed in further detail below with respect to FIGS. 9A-B.

The RF front end 114 can process the output signal 126 to generate one or more digital signals to be further processed by one or more other subsystems of the RF communication system 100. In some embodiments, the RF front end 114 can include one or more components to collectively perform at least a function to convert the output signal from an analog domain to a digital domain. As such, the RF front end 114 can be referred to as an analog-to-digital portion, or RF-to-baseband portion, of the RF communication system 100. For example, the RF front end 114 can include one or more filters, one or more detectors, one or more amplifiers, one or more local oscillators, one or more analog-to-digital converters, etc., which shall be discussed with respect to FIGS. 5A-B.

In some embodiments, the control circuit 112 can automatically perform the above-discussed iterations, which is sometimes referred to as an auto-nulling function or nulling function, until at least a null is determined (e.g., a direction of the null is determined). Such a nulling function can be selectively enabled by the RF communication system 100 based on various criteria such as, for example, responsive to the RF communication system 100 determining that the power consumption of the RF front end 114 has exceeded a predefined threshold. By enabling the nulling function, the RF communication system 100 can minimize or eliminate one or more interferences received by the RF communication system 100, even though sources, locations, and/or directions of such interferences are unknown. In some other embodiments, the RF communication system 100 can calibrate the TDUs 106 and 108 to determine, log, or manage the respective directions of one or more nulls that the RF communication system 100 may provide. As such, if the direction of an interference is known, the RF communication system 100 can readily use the calibrated settings of TDUs 106 and 108 to eliminate or minimize the known interference.

Figure 1B:
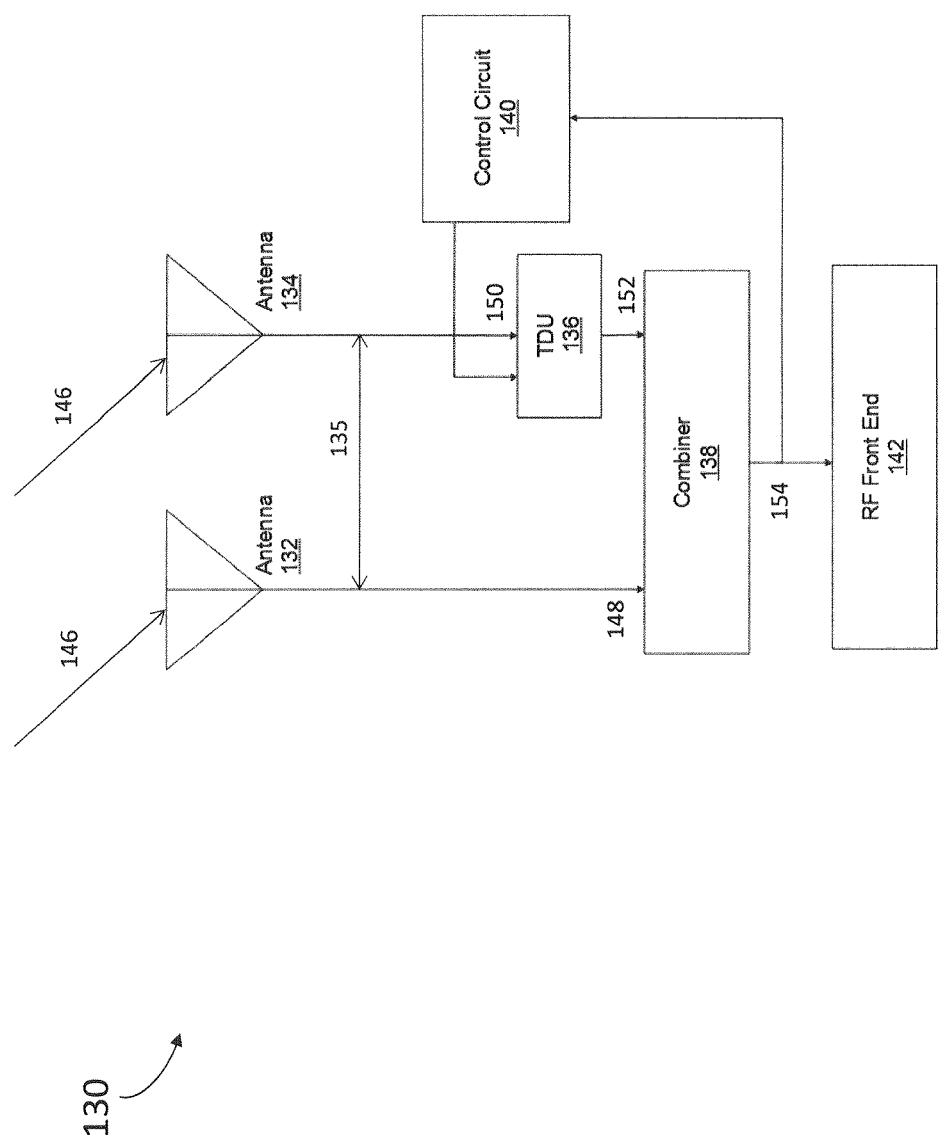
FIG. 1B is a block diagram of an RF communication system, in accordance with some embodiments of the inventive concepts disclosed herein.

Referring to FIG. 1B, depicted is a functional block diagram of an RF communication system 130. As shown in FIG. 1B, the RF communication system 130 includes a first antenna 132, a second antenna 134, a time delay unit (TDU) 136, a combiner 138, a control circuit 140, and an RF front end 142. The components 132-142 shown in the illustrated embodiment of FIG. 1B may constitute a portion of the RF communication system 130, which can further include any of various other RF communication components such as, for example, one or more digital baseband processing subsystems, one or more digital-to-analog processing subsystems, one or more transmitting subsystems, etc., while remaining within the scope of the present disclosure. Such other subsystems shall be discussed with respect to FIGS. 5A-B.

The RF communication system 130 is substantially similar as the RF communication system 100 of FIG. 1A except that in the RF communication system 130, only one of the antennas 132 and 134 is coupled with a TDU. Accordingly, the similar components (e.g., 136-142) may be briefly discussed below.

In the illustrated embodiment of FIG. 1B, the antennas 132 and 134, physically separated apart from each other by a distance 135, can receive one or more RF signals e.g., signal 146. Depending on the directions along which the antennas 132 and 134 receive the one or more RF signals 146, signals 148 and 150 respectively received through or by the antennas 132 and 134 (sometimes respectively referred to as "received signal 148" and "received signal 150") can be different, e.g., presenting a phase difference therebetween.

In some embodiments, the antenna 132 may be directly coupled to the combiner 138, and the antenna 134 may be coupled to the combiner via the TDU 136. The TDU 136 can apply dynamically configurable, adjustable, or determined time delays and power gains on the received signal 150 to generate a modified signal 152 (e.g., delayed in time by the time delay and amplified in power by the power gain), while the received signal 148 may not be delayed in time or amplified in power. The combiner 138 (e.g., a subtractor) can receive the received signal 148 and modified signal 152 as inputs and perform a subtraction function on the signals 148 and 152 to provide an output signal 154. The control circuit 140 and RF front end 142 can receive the output signal 154 as respective inputs.

Similar as the control circuit 112 of FIG. 1A, the control circuit 140 can determine a power level of the output signal 154, and based on the power level of the output signal 154 to determine the time delay and power gain used by the TDU 136. In some embodiments, the control circuit 140 can iteratively update the time delays and/or power gains that the TDU 136 uses on the received signals 150 based on the power level of the output signal 154. In some embodiments, the control circuit 140 can determine the time delay and power gain used by the TDU 136 to cause the combiner 138 to provide the output signal 154 as one or more nulls, responsive to determining a minimum power level of the output signal 154 over a number of iterations. In other words, the received signal 148, without being delayed and amplified, and the modified signal 152, with being delayed by the time delay and amplified by the power gain determined by the control circuit 140 in response to determining that the corresponding power level of the output signal 154 is a minimum over plural iterations of updating the time delays and/or power gains (used by the TDU 136). Such a null may be used to minimize or eliminate interferences that can be included within the one or more RF signals 146. The null, which shall be discussed in further detail below with respect to FIGS. 9A-B, can be provided to the RF front end 142 for further processing. The RF front end 142 is substantially similar to the RF front end 114 of FIG. 1A so that the discussions are not repeated.

The combiner 138 may receive the signal 148, without being delayed by dynamically adjustable time delays and amplified by dynamically adjustable power gains, as one of the inputs, as discussed above. In some other embodiments, the combiner 138 may receive the signal 148, which can be delayed in time by a predefined or fixed amount of time delay and amplified in power by a predefined or fixed amount of power gain. The fixed amount of time delay may be greater than the maximum value of a propagation delay between the antennas 132 and 134. Such a predefined amount of time delay and predefined amount of power gain may be applied on the signal 148 by one or more components such as, for example, a transmission line, a phase shifter, an amplifier, etc.

Figure 1C:
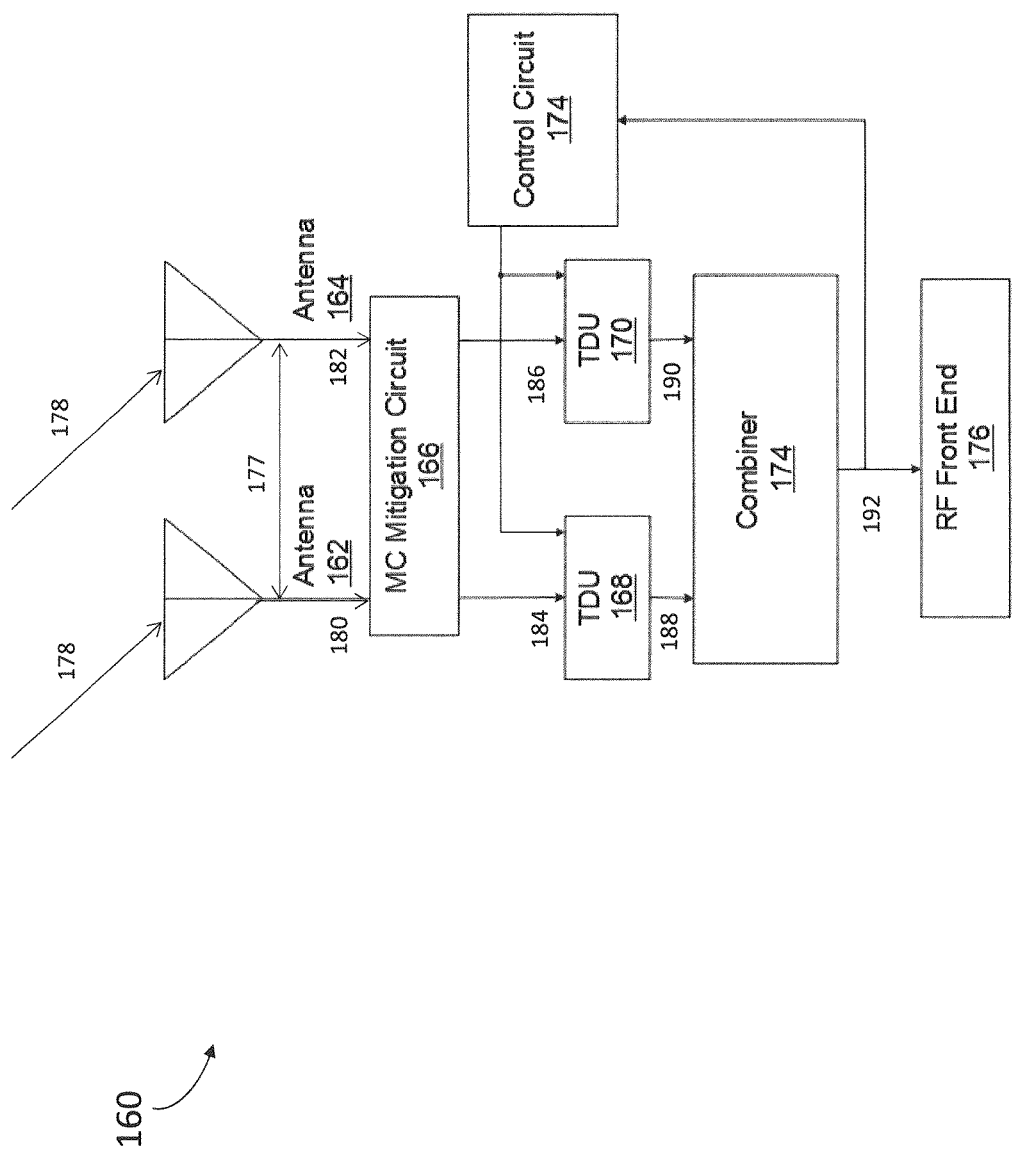
FIG. 1C is a block diagram of an RF communication system, in accordance with some embodiments of the inventive concepts disclosed herein.

Referring to FIG. 1C, depicted is a functional block diagram of an RF communication system 160. As shown in FIG. 1C, the RF communication system 160 includes a first antenna 162, a second antenna 164, a mutual coupling (MC) mitigation circuit 166, a first time delay unit (TDU) 168, a second TDU 170, a combiner 172, a control circuit 174, and an RF front end 176. The components 162-176 shown in the illustrated embodiment of FIG. 1C may constitute a portion of the RF communication system 160, which can further include any of various other RF communication components such as, for example, one or more digital baseband processing subsystems, one or more digital-to-analog processing subsystems, one or more transmitting subsystems, etc., while remaining within the scope of the present disclosure. Such subsystems shall be discussed with respect to FIGS. 5A-B.

The RF communication system 160 is substantially similar as the RF communication system 100 of FIG. 1A except that the RF communication system 160 can further include an MC mitigation circuit (e.g., 166). Accordingly, the similar components (e.g., 168-174) may be briefly discussed below.

In the illustrated embodiment of FIG. 1C, the antennas 162 and 164, physically separated apart from each other by a distance 177, can receive one or more RF signals e.g., signal 178. Depending on the directions along which the antennas 162 and 164 receive the one or more RF signals 178, signals 180 and 182 respectively received through or by the antennas 162 and 164 (sometimes respectively referred to as "received signal 162" and "received signal 164") can be different, e.g., presenting a phase difference therebetween. In some instances, when the antennas 162 and 164 receive the RF signal 178, at least one of the antennas 162 and 164 may re-radiate, backscatter, or scatter the RF signal 178, which can cause a mutual coupling between the antennas 162 and 164. Such a mutual coupling effect may be present in one or both of the received signals 180 and 182.

Figure 1D:
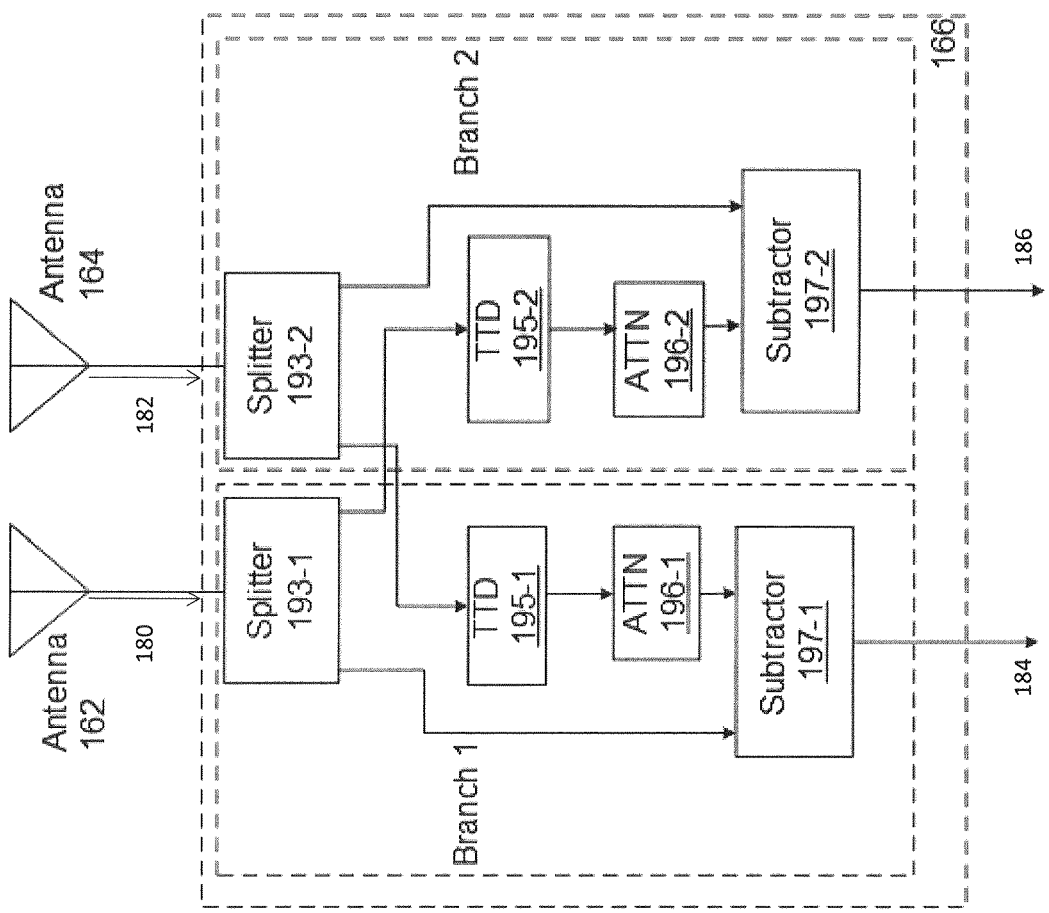
FIG. 1D is a block diagram of a mutual coupling mitigation circuit of the RF communication system of FIG. 1C, in accordance with some embodiments of the inventive concepts disclosed herein.

In some embodiments, the MC mitigation circuit 166, coupled to the antennas 162 and 164, can mitigate, minimize, or eliminate the mutual coupling effect present in one or both of the received signals 180 and 182 by measuring a power level of a signal re-radiated or scattered from one of the antennas 162 and 164 and, if needed, compensating the signal received by the other of the antennas 162 and 164. FIG. 1D illustrates an example of an embodiment of the MC mitigation circuit 166. As shown, the MC mitigation circuit 166 can include branches 1 and 2, each of which can include a splitter, a delay circuit (e.g., a true time delay (TTD)), an attenuation circuit (ATTN), and a subtractor. For example, branch 1 can include a splitter 193-1, a TTD 195-1, an ATTN 196-1, and a subtractor 197-1; and branch 2 can include a splitter 193-2, a TTD 195-2, an ATTN 196-2, and a subtractor 197-2. The splitter 193-1 of branch 1 can route the received signal 180 to the subtractor 197-1 of the same branch and to the TTD 195-2 and ATTN 196-2 of branch 2. Similarly, the splitter 193-2 of branch 2 can route the received signal 182 to the subtractor 197-2 of the same branch and to the TTD 195-1 and ATTN 196-1 of branch 1. As such, a first signal containing the mutual coupling effect, received by one of the antennas, can be mitigated by subtracting a second signal, received by the other of the antennas and then adjusted by the TTD and ATTN, from the first signal. In response to mitigating the mutual coupling effect, the MC mitigation circuit 166 can provide signals 184 and 186 to the TUDs 168 and 170, respectively. The signals 184 and 186 may be sometimes referred to as "mitigated signal 184" and "mitigated signal 186," respectively.

In response to receiving the mitigated signals 184 and 186, the TDU 168 can apply dynamically configurable, adjustable, or determined time delays and power gains on the mitigated signal 184 to generate a modified signal 188 (e.g., delayed in time by the time delay and amplified in power by the power gain); and the TDU 170 can apply dynamically configurable, adjustable, or determined time delays and power gains on the mitigated signal 186 to generate a modified signal 190 (e.g., delayed in time by the time delay and amplified in power by the power gain). Similarly, such modified signals 188 and 190 can be combined by the combiner 172 to generate an output signal 192. The control circuit 174 can receive the output signal 192 to determine the respective time delays and power gains that the TDUs 168 and 170 use. The combiner 174 can generate the output signal 192 as one or more nulls to eliminate or minimize interferences that can be included in RF signal 178. The RF front end 176 can receive the output signal 192 to further process the signal 192. Since the RF front end 176 can be substantially similar to the above-discussed RF front end, the discussions as to the RF front end 176 are not repeated.

In some other embodiments, the RF communication system 160 may optionally include one of the TDUs 168 and 170. The RF communication system 160 can be substantially similar to the RF communication system 130 except for including the MC mitigation circuit 166. In such embodiments, one of the mitigated signals 184 or 186 may be delayed in time by a dynamically configurable, adjustable, or determined time delay and/or amplified in power by a dynamically configurable, adjustable, or determined power gain, while the other of the mitigated signals 184 or 186 may or may not be delayed in time by a fixed time delay and/or amplified in power by a fixed power gain.

The above-discussed RF communication systems 100, 130, and 160 may be used to receive an RF signal with a single band, in accordance with some embodiments of the present disclosure. Embodiments of the RF communication systems of the present disclosure, however, are not limited to being used in a single band environment. According to some embodiments, the RF communication systems 200, 300, and 400, respectively illustrated in FIGS. 2, 3, and 4, can each be used in a multi-band environment. For example, each of the RF communication systems 200, 300, and 400 can receive a number of RF signals, which can reside in respective different bands, and provide one or more nulls at each of the different bands.

Figure 2:
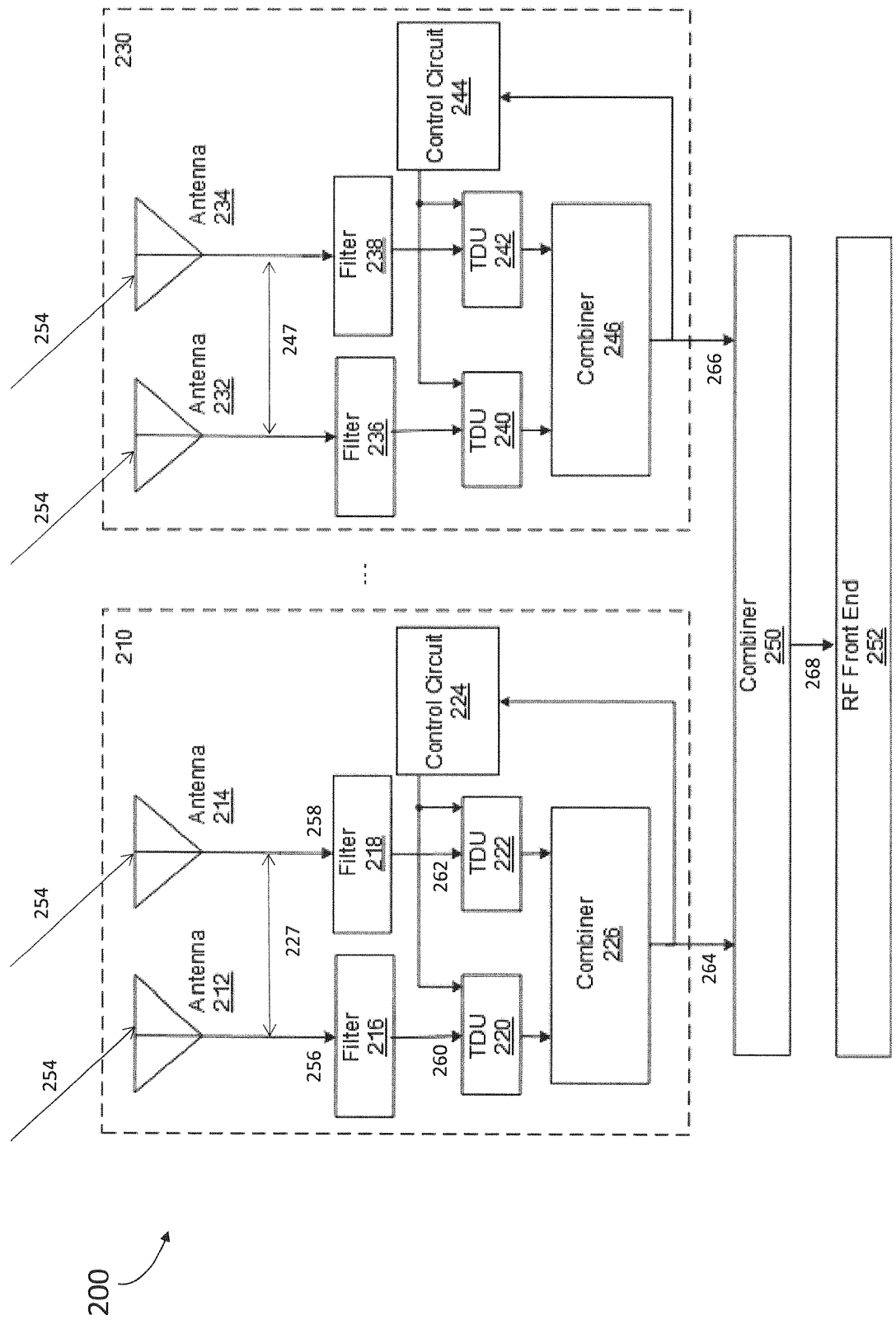
FIG. 2 shows a block diagram of an RF communication system, in accordance with some embodiments of the inventive concepts disclosed herein.

Referring to FIG. 2, a functional block diagram of the RF communication system 200 is depicted. As shown in FIG. 2, the RF communication system 200 can include a first antenna portion 210, a second antenna portion 230, a combiner 250, and an RF front end 252. Each of the antenna portions 210 and 230 may include one or more components, which shall be discussed below. The components shown in the illustrated embodiment of FIG. 2 may constitute a portion of the RF communication system 200, which can further include any of various other RF communication components such as, for example, one or more digital baseband processing subsystems, one or more digital-to-analog processing subsystems, one or more transmitting subsystems, etc., while remaining within the scope of the present disclosure. Such other subsystems shall be discussed with respect to FIGS. 5A-B.

In some embodiments, the first antenna portion 210 may provide one or more nulls at a first band; and the second antenna portion 230 may provide one or more nulls at a second band, wherein the second band is different from the first band. Although two antenna portions are shown in the illustrated embodiment of FIG. 2, the RF communication system 200 can include any desired number of antenna portions while remaining within the scope of the present disclosure. As such, the RF communication system 200 can provide nulls at respective different bands that are more than 2.

The antenna portion 210 can include a first antenna 212, a second antenna 214, a first filter 216, a second filter 218, a first time delay unit (TDU) 220, a second TDU 222, a control circuit 224, and a combiner 226. The antennas 212 and 214 may be physically apart from each other by a distance 227. Similarly, the antenna portion 230 can include a first antenna 232, a second antenna 234, a first filter 236, a second filter 238, a first TDU 240, a second TDU 242, a control circuit 244, and a combiner 246. The antennas 232 and 234 may be physically apart from each other by a distance 247. The antenna portions 210 and 230 can be each substantially similar as a portion of the RF communication system 100 (e.g., 102-110 of FIG. 1A) except that the antenna portions 210 and 230 can each include a pair of filters coupled between respective antennas and TDUs. Thus, the discussions of similar components are repeated again.

In the antenna portion 210, the filter 216 can be coupled between the antenna 212 and TDU 220; and the filter 218 can be coupled between the antenna 214 and TDU 222. In some embodiments, each of the filters 216 and 218 can include a band-pass filter that can allow the portion of a signal within a certain frequency range to pass therethrough and reject, or attenuate, the portion of the signal outside the frequency range. Such a frequency range used by the filters 216 and 218 may correspond to a first band (hereinafter "band 1") in which the antenna portion 210 generates nulls.

For example, the RF communication system 200 can receive one or more RF signals 254 with a frequency ranging from about 2 GHz to 6 GHz. In response to the antenna portion 210 receiving the RF signal 254, the filters 216 and 218 may filter received signals 256 and 258, respectively received through or by the antennas 212 and 214. The filter 216 may pass the portion of the signal 256 inside band 1 (e.g., about 2~3 GHz) and reject the portion of the signal 256 outside band 1. The filter 218 may pass the portion of the signal 258 inside band 1 (e.g., about 2~3 GHz) and reject the portion of the signal 258 outside band 1. As such, in response to receiving such filtered signals 260 and 262, the TDUs 220 and 222, control circuit 224, and combiner 226 of the antenna portion 210 can follow the similar operations, as discussed above, to generate an output signal 264 as one or more nulls at band 1.

Similarly, in the antenna portion 230, the filter 236 can be coupled between the antenna 232 and TDU 240; and the filter 238 can be coupled between the antenna 234 and TDU 242. In some embodiments, the filters 236 and 238 of the antenna portion 230 may use another different frequency range (e.g., about 3~4 GHz), which may correspond to a second band (hereinafter "band 2"), to filter the respective signals received through or by the antennas 232 and 234. Accordingly, the TDUs 240 and 242, control circuit 244, and combiner 246 of the antenna portion 230 can follow the similar operations, as discussed above, to generate an output signal 266 as one or more nulls at band 2.

In some embodiments, the combiner 250 can combine the respective output signals generated by the antenna portions, e.g., 210 and 230, and provide a single combined signal 268 to the RF front end 252 for further processing, as discussed above. Continuing with the above example, the combiner 250 can combine (e.g., add) the output signals 264 and 266, each of which can include one or more nulls at the respective band, and provide such the signal 268 to the RF front end 252 for further processing.

Figure 3:
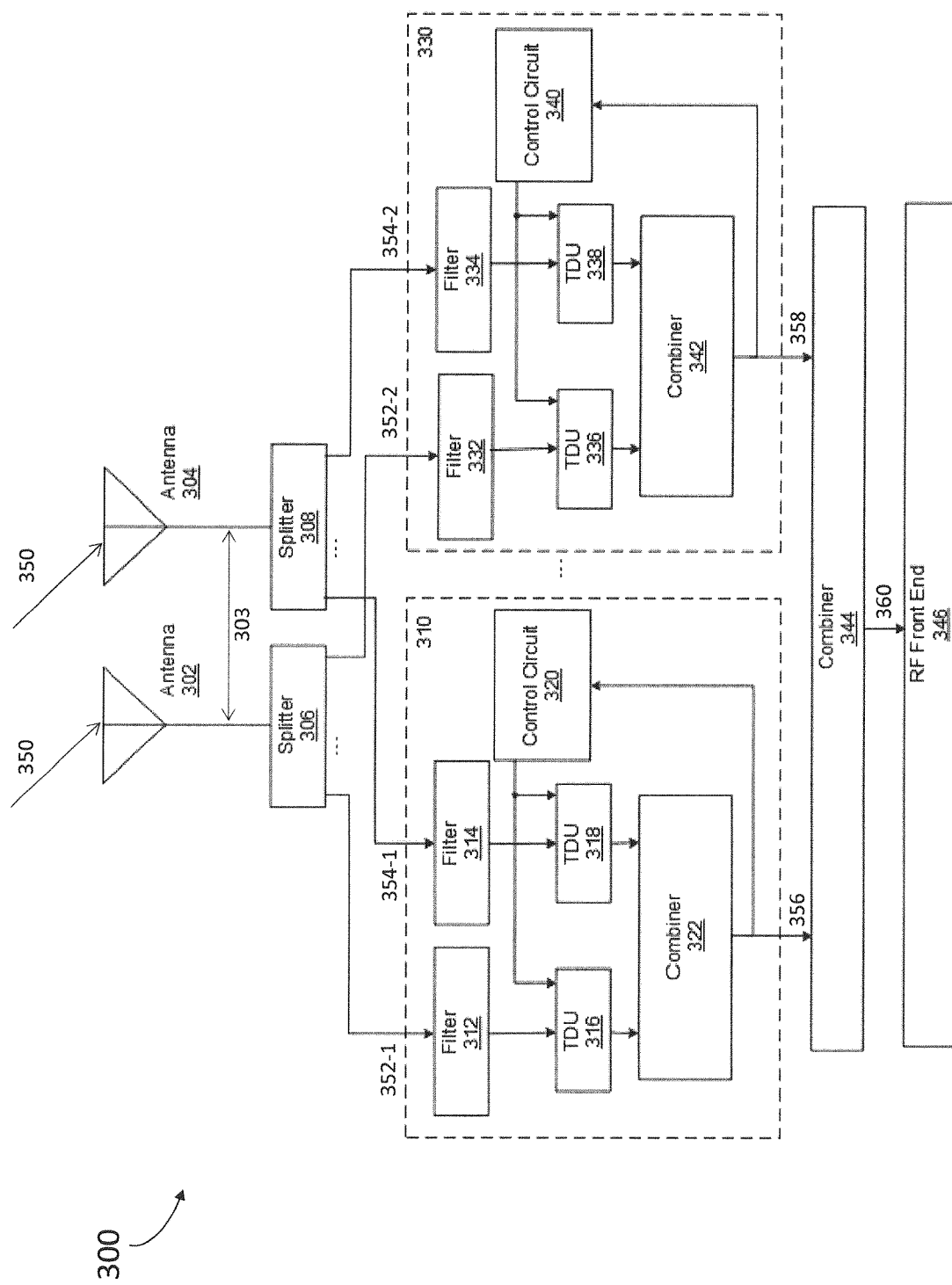
FIG. 3 shows a block diagram of an RF communication system, in accordance with some embodiments of the inventive concepts disclosed herein.

Referring to FIG. 3, a functional block diagram of the RF communication system 300 is depicted. As shown in FIG. 3, the RF communication system 300 can include a first antenna 302, a second antenna 304, a first splitter 306, a second splitter 308, a first nulling portion 310, a second nulling portion 330, a combiner 344, and an RF front end 346. Each of the nulling portions 310 and 330 may include one or more components, which shall be discussed below. The components shown in the illustrated embodiment of FIG. 3 may constitute a portion of the RF communication system 300, which can further include any of various other RF communication components such as, for example, one or more digital baseband processing subsystems, one or more digital-to-analog processing subsystems, one or more transmitting subsystems, etc., while remaining within the scope of the present disclosure. Such other subsystems shall be discussed with respect to FIGS. 5A-B.

The antennas 302 and 304 of the RF communication system 300 may be physically apart from each other by a distance 303. The RF communication system 300 can receive one or more RF signals 350 using the antennas 302 and 304. In response to receiving the RF signals 350, the splitters 306 and 308, respectively coupled to the antennas 302 and 304, can each split, divide, or route the respective received signal into a number of routed signals to respective nulling portions, according to some embodiments. Each of such a number of routed signals may have an equal amplitude, 0° phase difference between one and anther, and/or an equal power level. For example, the splitter 306 can split received signal 352 (the signal 350 received by the antenna 302) into routed signals 352-1, 352-2, etc.; and the splitter 308 can split signal 354 (the signal 350 received by the antenna 304) into routed signals 354-1, 354-2, etc. The routed signals 352-1 and 354-1 can be provided to the first nulling portion 310; and the routed signals 352-2 and 354-2 can be provided to the nulling portion 330.

In some embodiments, the first nulling portion 310 may provide one or more nulls at a first band; and the second nulling portion 330 may provide one or more nulls at a second band, wherein the second band is different from the first band. Although two nulling portions are shown in the illustrated embodiment of FIG. 3, the RF communication system 300 can include any desired number of nulling portions while remaining within the scope of the present disclosure. As such, the RF communication system 300 can provide nulls at respective different bands that are more than 2.

The nulling portion 310 can include a first filer 312, a second filter 314, a first time delay unit (TDU) 316, a second TDU 318, a control circuit 320, and a combiner 322. The nulling portion 330 can include a first filer 332, a second filter 334, a first TDU 336, a second TDU 338, a control circuit 340, and a combiner 342. In some embodiments, each of the nulling portions 310 and 330 of the RF communication system 300 can be substantially similar to the antenna portion of the RF communication system 200 (e.g., 210 and 230) except that the nulling portions may not include an antenna, and each of the TDUs of the nulling portion may receive a routed signal (e.g., 352-1, 354-1, etc.) as input. Thus, the nulling portions 310 and 330 of the RF communication system 300 may be briefly discussed below.

According to some embodiments, each of the filters 312, 314, 332, and 334 can include a band-pass filter that can allow the portion of a signal within a certain frequency range to pass therethrough and reject, or attenuate, the portion of the signal outside the frequency range. The frequency range used by the filters 312 and 314 of the first nulling portion 310 may correspond to a first band (hereinafter "band 1") in which the nulling portion 310 generates nulls; and the frequency range used by the filters 312 and 314 of the second nulling portion 330 may correspond to a second band (hereinafter "band 2") in which the nulling portion 330 generates nulls.

For example, the RF communication system 300 can receive one or more RF signals 350 with a frequency ranging from about 2 GHz to 6 GHz. In response to the antenna 302 and 304 receiving the RF signal 350 as the received signals 352 and 354, respectively, the splitter 306, coupled to the antenna 302, can split the received signal 352 into routed signals 352-1 and 352-2; and the splitter 308, coupled to the antenna 304, can split the received signal 354 into routed signals 354-1 and 354-2. Each of the routed signals 352-1-2 and 354-1-2 may remain to have the frequency, as received (e.g., substantially similar as the respective received signal), according to some embodiments. Each of the respective different nulling portions 310 and 330 can receive a number of routed signals respectively split from different splitters.

In response, the filters 312 and 314 of the nulling portion 310 may filter routed signals 352-1 and 354-1, respectively. The filter 312 may pass the portion of the signal 352-1 inside band 1 (e.g., about 2~3 GHz) and reject the portion of the signal 352-1 outside band 1. The filter 314 may pass the portion of the signal 354-1 inside band 1 (e.g., about 2~3 GHz) and reject the portion of the signal 354-1 outside band 1. Similar as the operation discussed above with respect to the antenna portions 210 and 230 of FIG. 2, responsive to receiving the signals filtered by the filters 312 and 314, the TDUs 316 and 318, control circuit 320, and combiner 322 can generate an output signal 356 as one or more nulls at band 1.

Similarly, in response to receiving the routed signals 352-2 and 354-2, the filters 332 and 334 of the nulling portion 330 may filter routed signals 352-2 and 354-2, respectively. The filter 332 may pass the portion of the signal 352-2 inside band 2 (e.g., about 3~4 GHz) and reject the portion of the signal 352-2 outside band 2. The filter 334 may pass the portion of the signal 354-2 inside band 2 (e.g., about 3~4 GHz) and reject the portion of the signal 354-2 outside band 2. And responsive to receiving the signals filtered by the filters 332 and 334, the TDUs 336 and 338, control circuit 340, and combiner 342 can generate an output signal 358 as one or more nulls at band 2.

In some embodiments, the combiner 344 can combine the respective output signals generated by the nulling portions, e.g., 310 and 330, and provide a single combined signal 360 to the RF front end 346 for further processing, as discussed above. Continuing with the above example, the combiner 344 can combine (e.g., add) the output signals 356 and 358, each of which can include one or more nulls at the respective band, and provide the signal 360 to the RF front end 346 for further processing.

Figure 4:
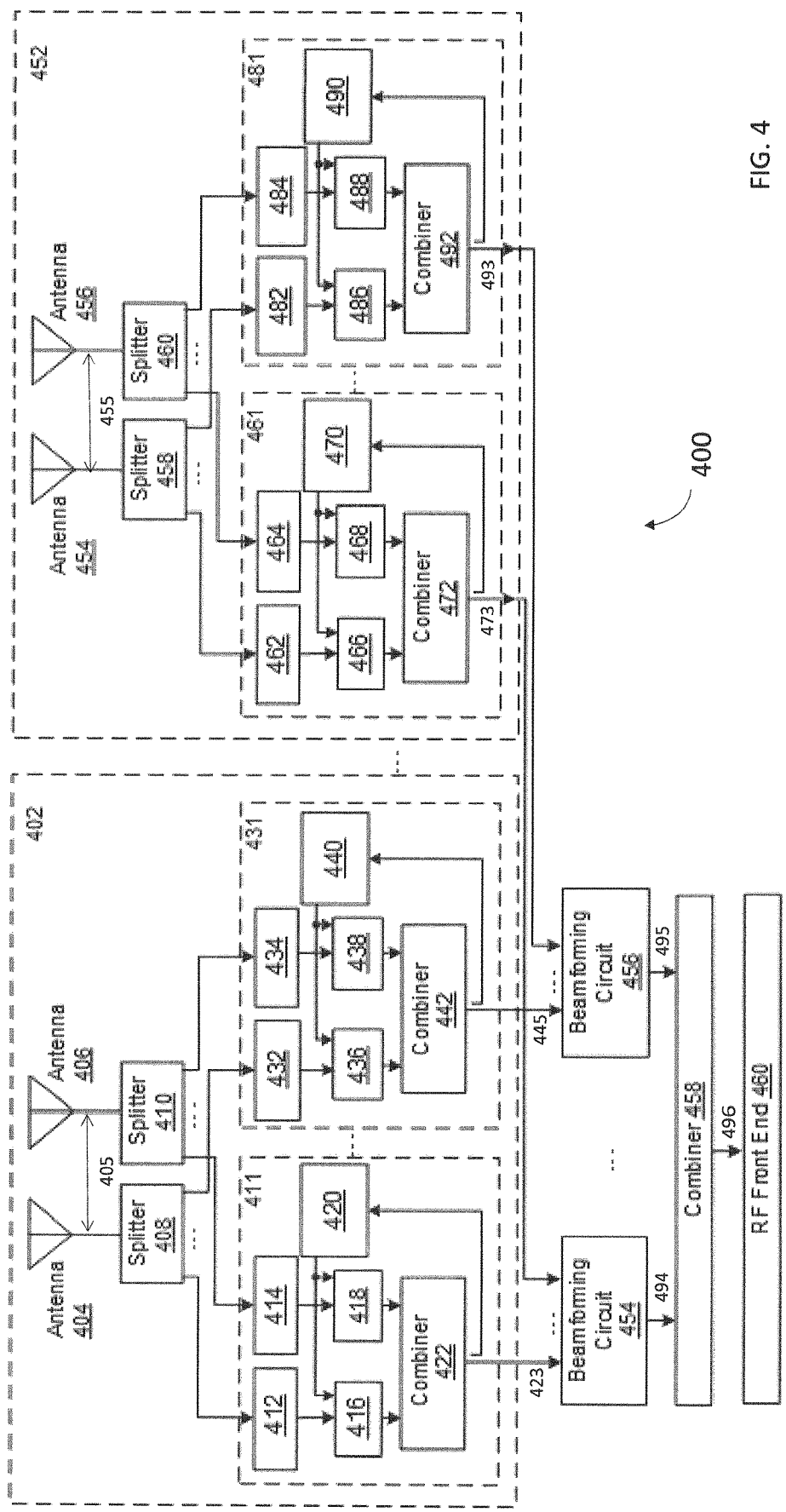
FIG. 4 shows a block diagram of an RF communication system, in accordance with some embodiments of the inventive concepts disclosed herein.

Referring to FIG. 4, a functional block diagram of the RF communication system 400 is depicted. As shown in FIG. 4, the RF communication system 400 can include a first antenna array portion 402, a second antenna array portion 452, a first beamforming circuit 454, a second beamforming circuit 456, a combiner 458, and an RF front end 460. Each of the antenna array portions 402 and 452 may include one or more components, which shall be discussed below. The components shown in the illustrated embodiment of FIG. 4 may constitute a portion of the RF communication system 400, which can further include any of various other RF communication components such as, for example, one or more digital baseband processing subsystems, one or more digital-to-analog processing subsystems, one or more transmitting subsystems, etc., while remaining within the scope of the present disclosure. Such other subsystems shall be discussed with respect to FIGS. 5A-B.

In some embodiments, each of the antenna array portions (e.g., 402 and 452) of the RF communication system 400 can be substantially similar as a combination of the pair of antennas 302 and 304, the pair of splitters 306 and 308, and the plural nulling portions 310 and 330 of FIG. 3. Therefore, the antenna array portions of the RF communication system 400 may be briefly described as follows.

As shown in the illustrated embodiment of FIG. 4, the first antenna array portion 402 can include a first antenna 404, a second antenna 406 physically separated from the first antenna 404 by a distance 405, a first splitter 408, a second splitter 410, a first nulling portion 411, and a second nulling portion 431. Similar as the nulling portions discussed with respect to FIG. 3, the first nulling portion 411 can include filters (e.g., band-pass filters) 412 and 414, TDUs 416 and 418, a control circuit 420, and a combiner (e.g., a subtractor) 422; and the second nulling portion 431 can include filters (e.g., band-pass filters) 432 and 434, TDUs 436 and 438, a control circuit 440, and a combiner (e.g., a subtractor) 442. The first nulling portion 411 can provide an output signal 423 as one or more nulls at a first band (hereinafter "band 1"); and the second nulling portion 431 can provide an output signal 445 as one or more nulls at a second band (hereinafter "band 2"), wherein the second band is different from the first band.

Similarly, the second antenna array portion 452 can include a first antenna 454, a second antenna 456 physically separated from the first antenna 454 by a distance 455, a first splitter 458, a second splitter 460, a first nulling portion 461, and a second nulling portion 481. Similar as the nulling portions discussed with respect to FIG. 3, the first nulling portion 461 can include filters (e.g., band-pass filters) 462 and 464, TDUs 466 and 468, a control circuit 470, and a combiner (e.g., a subtractor) 472; and the second nulling portion 481 can include filters (e.g., band-pass filters) 482 and 484, TDUs 486 and 488, a control circuit 490, and a combiner (e.g., a subtractor) 492. The first nulling portion 461 can provide an output signal 473 as one or more nulls at the band 1; and the second nulling portion 481 can provide an output signal 493 as one or more nulls at the second band.

According to some embodiments, the nulling portions of respective different antenna array portions of the RF communication system 400 can provide output signals as one or more nulls at a same band to a beamforming circuit as inputs. For example, the nulling portion 411 of the antenna array portion 402 can provide the output signal 423 as one or more nulls at the band 1 to the beamforming circuit 454, and the nulling portion 461 of the antenna array portion 452 can provide the output signal 473 as one or more nulls at the band 1 to the beamforming circuit 454. The nulling portion 431 of the antenna array portion 402 can provide the output signal 445 as one or more nulls at the band 2 to the beamforming circuit 456, and the nulling portion 481 of the antenna array portion 452 can provide the output signal 493 as one or more nulls at the band 2 to the beamforming circuit 456.

Although two antenna array portions are shown in the illustrated embodiment of FIG. 4, the RF communication system 400 can include any desired number of antenna array portions while remaining within the scope of the present disclosure. Although two nulling portions are shown in each of the antenna array portions of the RF communication system 400, the RF communication system 400 can include any desired number of nulling portions in each of the antenna array portions while remaining within the scope of the present disclosure. For example, the RF communication system 400 can include more than 2 antenna array portions, and/or each of the antenna array portions can include more than 2 nulling portions.

In response to receiving the nulls at a certain band from the respective nulling portions of different antenna array portions, the beamforming circuit of the RF communication system 400 can use one or more beamforming techniques (e.g., digital beamforming techniques, analog beamforming techniques, hybrid beamforming techniques, and/or adaptive beamforming techniques) to further minimize the nulls and/or generate one or more additional nulls. In some embodiments, such additional nulls may be each pointed along a direction different from ones of the nulls provided by the nulling portions. Such beamforming techniques may be known in the art, so that the beamforming circuits 454 and 456 shall be briefly discussed as follows. In some embodiments, the beamforming circuit 454 may combine the output signals 423 and 473 to generate signal 494 at band 1 in a way (e.g., respective different weights) where an expected pattern or radiation is preferentially observed; and the beamforming circuit 454 may combine the output signals 445 and 493 to generate signal 495 at band 2 in a way (e.g., respective different weights) where an expected pattern or radiation is preferentially observed.

In response to the beamforming circuits 454 and 456 generating the signals, respectively, in some embodiments, the combiner 458 can combine the signals 494 and 495, and provide a single combined signal 496 to the RF front end 460 for further processing, as discussed above. Continuing with the above example, the combiner 458 can combine (e.g., add) the output signals 494 and 495, each of which can include one or more nulls at the respective band, and provide the signal 496 to the RF front end 460 for further processing.

Figure 5A:
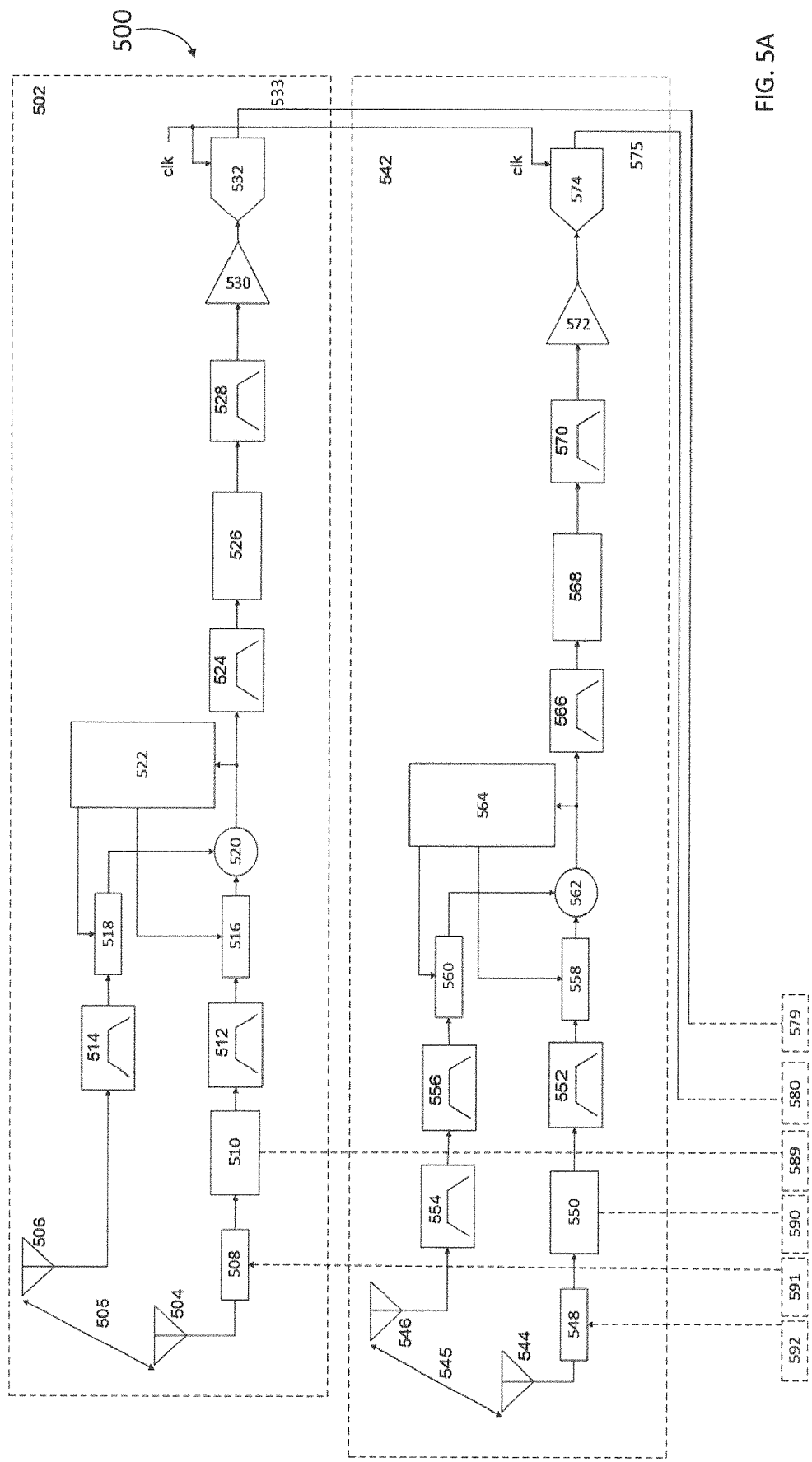
FIGS. 5A and 5B collectively show a block diagram of an RF communication system, in accordance with some embodiments of the inventive concepts disclosed herein.
Figure 5B:
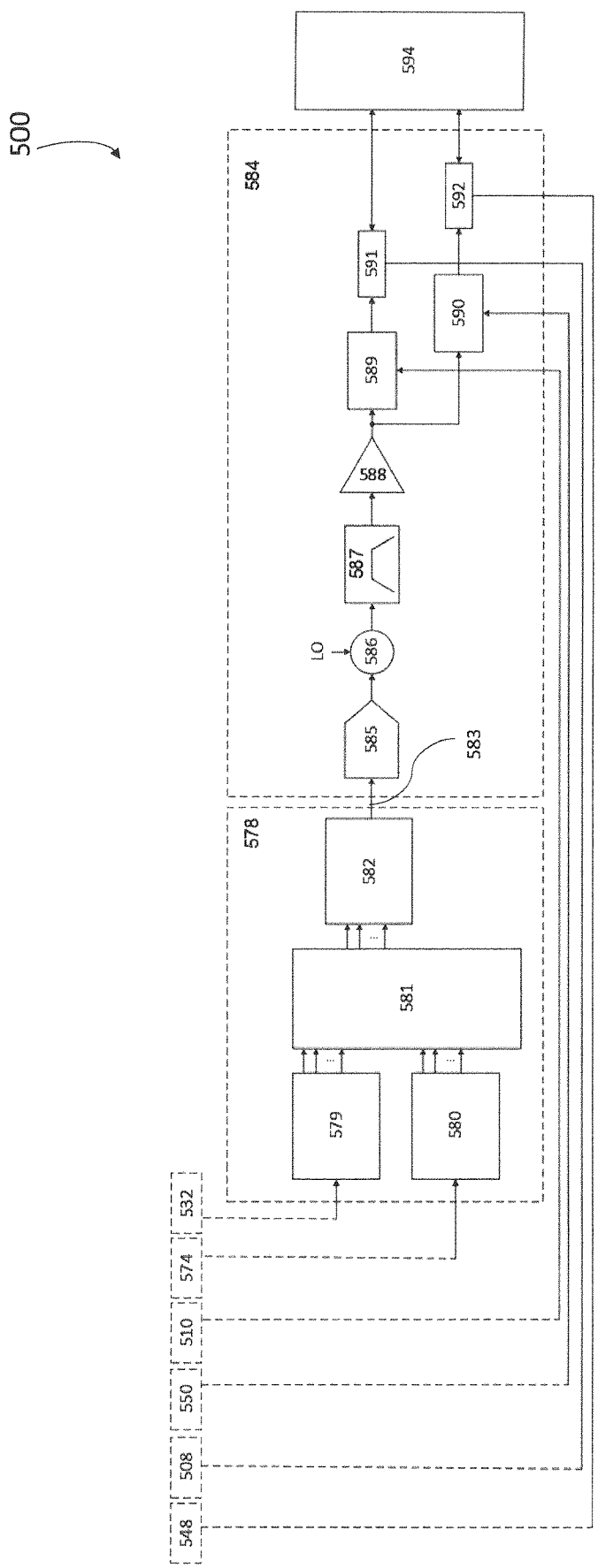

Referring to FIGS. 5A-B, a functional block diagram of the RF communication system 500 is depicted. In some embodiments, the RF communication system 500 may selectively switch between a receiving mode and transmitting mode, which shall be discussed below. As shown in the illustrated embodiment of FIGS. 5A-B, the RF communication system 500 can include a first RF head 502, a second RF head 542, a digital processing subsystem 578, a digital-to-RF subsystem 584, and an RF front end 594.

In some embodiments, the RF heads 502 and 542, each of which includes a pair of antennas and components that can perform the above-described nulling function, can receive an RF signal to generate one or more digital signals. Such one or more digital signals can include one or more nulls, generated by performing the nulling function. The RF communication system 500 can use the one or more nulls to eliminate or minimize interferences that can be included in the received RF signals. The digital processing subsystem 578 can digitally process (e.g., channelize, beamforming, etc.) the digital signals. The digital-to-RF subsystem 584 can convert the digitally processed signal back to one or more RF (e.g., analog) signals, and provide the one or more RF signals to the RF front end 594 for further processing.

As shown in the illustrated embodiment of FIGS. 5A-B, the RF head 502 can include a first antenna 504, a second antenna 506 separated from the first antenna 504 by a distance 505, a transmitting/receiving (T/R) switch 508, a bypass switch 510, filters (e.g., band-pass filters) 512 and 514, time delay units (TDUs) 516 and 518, a subtractor 520, a control circuit 522, band-pass filters 524 and 528 with an amplifier 526 coupled therebetween, an amplifier 530, and an analog-to-digital converter 532. The RF head 542 can include a first antenna 544, a second antenna 546 separated from the first antenna 544 by a distance 545, a transmitting/receiving (T/R) switch 548, a bypass switch 550, filters (e.g., band-pass filters) 552, 554, and 556, time delay units (TDUs) 558 and 560, a subtractor 562, a control circuit 564, band-pass filters 566 and 570 with an amplifier 568 coupled therebetween, an amplifier 572, and an analog-to-digital converter 574. In some embodiments, the first and second RF heads 502 and 542 can be substantially similar to each other. Thus, the first RF head 502 is selected as a representative example in the following discussions.

The filters 512 and 514, TDUs 516 and 518, subtractor 520, and control circuit 522 are substantially similar to the components discussed of FIG. 1A-4, respectively, such that the discussions are not repeated. In some embodiments, the T/R switch 508 may switch the RF head 502 between the receiving mode and transmitting mode based on a control signal. For example, when the control signal causes the T/R switch 508 to switch the RF head 502 to the receiving mode, the T/R switch 508 may allow a signal received by the antenna 504 to be received by the following subsystems or circuits such as, for example, the RF front end 580. When the control signal causes the T/R switch 508 to switch the RF head 502 to the transmitting mode, the T/R switch 508 may allow a signal directly received from the RF front end 580 to be transmitted by the antenna 508.

In some embodiments, the bypass switch 510 can allow the signal received by the antenna 508 to bypass the following components of the RF head 502, the digital processing subsystem 544, and a portion of the digital-to-RF subsystem 550, and to be directly received by the RF front end 580. In some embodiments, the bypass switch 510 may be controlled by a control signal to determine whether to allow the signal received by the antenna 508 to bypass the following components of the RF head 502 and the rest, as discussed above. In some embodiments, in response to allowing the bypass, the RF head 502 may not perform a nulling function on the signal received by the antenna 508.

In response to the bypass not being allowed, the filters 512 and 514, TDUs 516 and 518, subtractor 520, and control circuit 522 can perform a nulling function on the signals received by the antennas 506 and 508 to generate an output signal 523, which may or may not include a null. The components 524-532 can "filter" and "sample" the signal 523, as known in the art, such that the components 524-532 may be briefly described as follows. In some embodiments, each of the filters 524 and 528 may include a band-pass filter, wherein the filer 524 can allow a signal with a very high frequency to pass and the filter 528 can reject image and/or be anti-aliasing. The amplifier 526 may include a non-linear amplifier configured to avoid saturation. The amplifier 530 can avoid clipping. The analog-to-digital converter 532, which can receive a clock signal, can convert the signal 523, through the respective operations of the components 524-530, into a digital signal 533. Similarly, the RF head 542 can provide a digital signal 575 by using the included components to perform respective functions.

In some embodiments, the digital processing subsystem 578 can include a first channelization circuit 579, a second channelization circuit 580, a beamforming circuit 581, and a mixer 582. The first channelization circuit 579 can channelize the digital signal 533, received from the first RF head 502, into a number of different (frequency) channels. The second channelization circuit 580 can channelize the digital signal 575, received from the second RF head 542, into a number of different (frequency) channels. The beamforming circuit 581 can use at least one of the above-mentioned beamforming techniques to process the signals at each of the channels. The mixer 582 can then mix (e.g., convert) the signals at different channels to a single processed signal 583.

The digital-to-RF subsystem 584 can include a digital-to-analog converter 585, a mixer 586, a filter 587, an amplifier 588, a first bypass filter 589, a second bypass filter 590, a first T/R switch 591, and a second T/R switch 582. The digital-to-analog converter 585 can convert the signal 583 in the digital domain into the analog domain, and such a converted analog signal can be further processed by the mixer 586, filter 587, and amplifier 588. The bypass switch 589 may be controlled by the same control signal that controls the bypass switch 510 of the RF head 502, and the bypass switch 590 may be controlled by the same control signal that controls the bypass switch 550 of the RF head 542. As such, when the bypass switch 510 allows the signal received by the antenna 508 to bypass the RF head 502, the digital processing subsystem 578, and a portion of the digital-to-RF subsystem 584, the bypass switch 589 can route the signal to be directly received by the RF front end 594 through the T/R switch 591. The bypass switch 590 and the bypass switch 550 of the RF head 542 may operate similarly.

The T/R switch 591 may be controlled by the same control signal that controls the T/R switch 508 of the RF head 502, and the T/R switch 592 may be controlled by the same control signal that controls the T/R switch 548 of the RF head 542. As such, when the T/R switch 508 switch switches the RF head 502 to the receiving mode, the T/R switch 591 can allow the signal received from the bypass switch 589 to be received by the RF front end 594. When the T/R switch 508 switch switches the RF head 502 to the transmitting mode, the T/R switch 591 can allow the signal received from the RF front end 594 to be transmitted through the antenna 504 directly. The T/R switch 592 and the T/R switch 548 of the RF head 542 may operate similarly.

B. Methods to Operate RF Communication Systems

Figure 6:
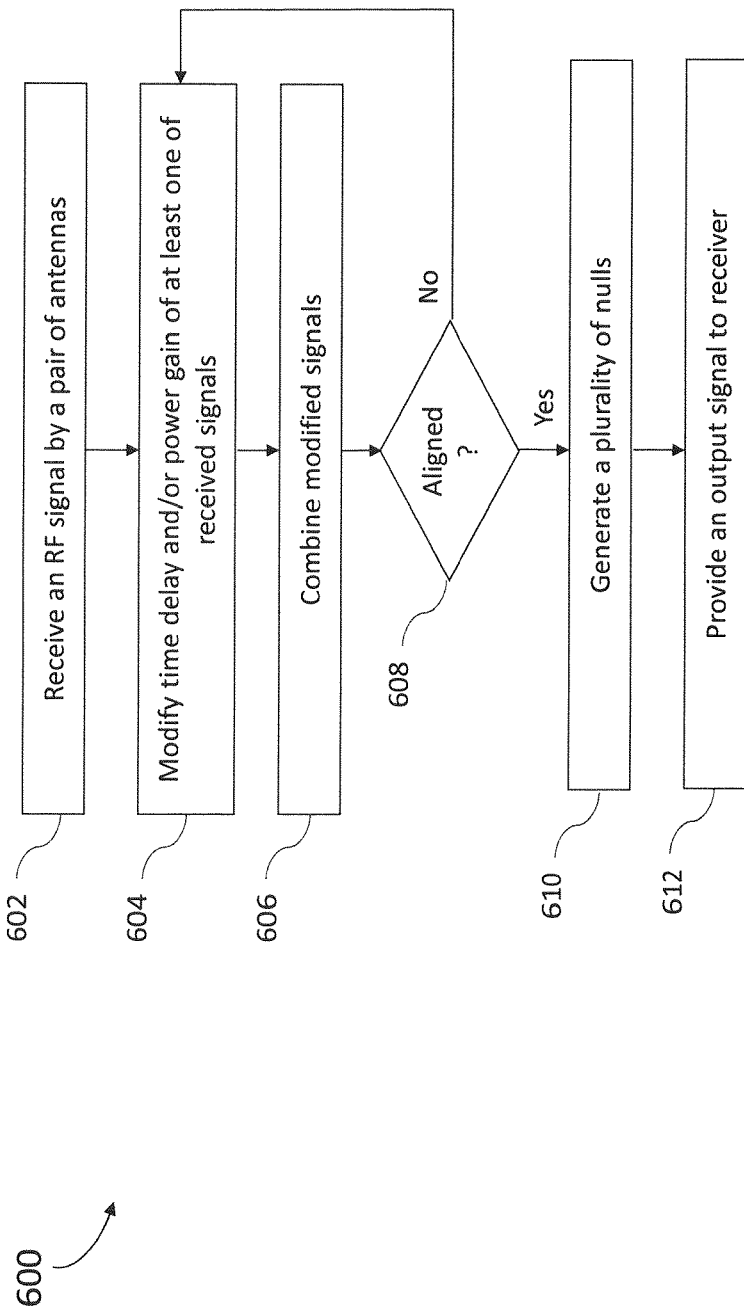
FIG. 6 shows a flow chart of an exemplary method to operate the RF communication systems of FIGS. 1A-D, in accordance with some embodiments of the inventive concepts disclosed herein.

FIG. 6 illustrates a flow chart of an exemplary method 600 to operate an RF communication system. In accordance with some embodiments of the present disclosure, the method 600 may be performed by the respective components of the RF communication systems 100, 130, and 160 discussed with respect to FIGS. 1A-C. For purposes of discussion, the following embodiment of the method 600 will be described in conjunction with FIGS. 1A-D. The illustrated embodiment of the method 600 is merely an example. Therefore, it should be understood that any of a variety of operations may be omitted, re-sequenced, and/or added while remaining within the scope of the present disclosure.

In brief overview, a pair of antennas can receive an RF signal at operation 602. At operation 604, one or more time delay units (TDUs) can modify a time delay and/or power gain of at least one of received signals. At operation 606, a subtractor can combine modified signals. At operation 608, a control circuit can determine whether the modified signals are aligned. If not, the method 600 may proceed again to operation 604; but if so, the method 600 proceeds to operation 610 in which the subtractor can generate a plurality of nulls. At operation 612, the subtractor can provide an output signal, which can contain the plurality of nulls, to a receiver.

Referring still to FIG. 6, and in greater detail, the pair of antennas can receive an RF signal at operation 602. As a representative example, in FIG. 1A, the pair of antennas 102 and 104 can receive the RF signal 116. In some embodiments, the pair of antennas 102 and 104 may be physically separated apart from each other by distance 115. The distance 115 can be associated with one or more characteristics of the RF signal 116. For example, the distance 115 may be either greater or less than a half of the wavelength ($\lambda/2$) of the RF signal 116. As the separation distance between the pair of antenna becomes larger than $\lambda/2$, one or more aliased nulls can be generated by the RF communication system, which shall be discussed in further detail below with respect to FIG. 10.

At operation 604, one or more time delay units (TDUs) can modify a time delay and/or power gain of at least one of received signals. According to some embodiments, in response to the pair of antennas receiving the RF signal, a first TDU, coupled to one of the pair of antennas, can modify a corresponding signal received by the one of the pair of antennas by applying a dynamically configurable time delay and/or power gain on the received signal. Simultaneously or subsequently, a second TDU, coupled to the other of the pair of antennas, can modify a corresponding signal received by the other of the pair of antennas by applying another dynamically configurable time delay and/or power gain on the received signal. In another embodiment, a phase shifter and/or transmission line, coupled to the other of the pair of antennas, can modify the signal received by the other of the pair of antennas by applying a fixed time delay and/or power gain on the received signal.

Continuing with the example of FIG. 1A, the TDUs 106 and 108 can apply dynamically configurable time delays and/or power gains on the signals 118 and 120 that are respectively received by the antennas 102 and 104. In the example of FIG. 1B, one TDU 136 can apply a dynamically configurable time delay and/or power gain on the signal 150 that is received by the antenna 134, while the signal 148, received by the antenna 132, may be applied with no time delay or power gain.

At operation 606, the subtractor combines the modified signals. According to some embodiments, in response to the received signals being modified, the subtractor, coupled to the TDU(s), combines (e.g., subtract) the modified signals to generate an output signal.

At operation 608, the control circuit can determine whether the modified signals are aligned. According to some embodiments, in response to the subtractor combining the modified signals, the control circuit can determine whether the modified signals are aligned in time and power levels by monitoring or detecting whether a power level of the output signal has reach a minimum. In some embodiments, the control circuit can iteratively adjust the time delay(s) and/or power gain(s) that the TDU(s) apply on the respective received signal(s) until the control circuit has detected a minimum of the power levels of the output signal over a number of iterations.

If the control circuit cannot determine a minimum of the power level at a current iteration, the control circuit can update the time delay(s) and/or power gain(s) that the TDU(s) apply on the received signal(s) (operation 604). If the control circuit can determine a minimum of the power level at the current iteration, the subtractor can provide the output signal, generated by combining the modified signals, as a plurality of nulls (operation 610). In some embodiments, in response to the control circuit determining the minimum power level of the output signal, the control circuit can record, manage, or store the time delay(s) and/or power gain(s) that the TDU(s) apply on the received signal(s).

At operation 612, the subtractor can provide the output signal, which can contain the plurality of nulls, to the receiver. In the case where the receiver receives an output signal containing nulls, the receiver may receive an RF signal through the antennas that is aligned with respective directions of the nulls. In some embodiments, the subtractor may provide an output signal to the receiver, which can be an RF front end, during each time of the iterations. As the control circuit can iteratively update the time delay(s) and/or power gain(s) that the TDU(s) apply on the received signal(s), at least one of the output signals respectively provided over the plural iterations can include a null. The RF front end can use such a null to eliminate or minimize a known or an unknown interference.

Figure 7:
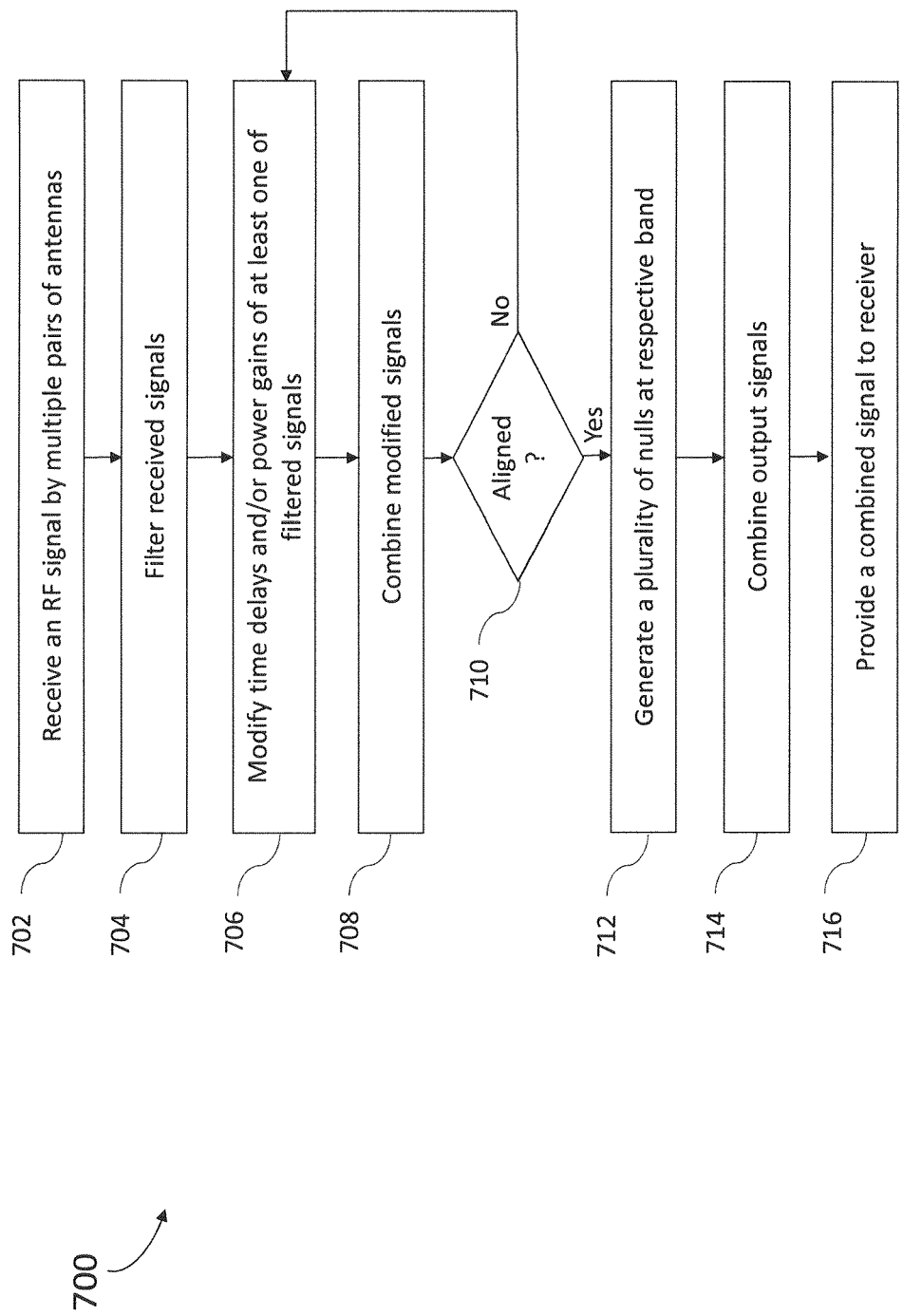
FIG. 7 shows a flow chart of an exemplary method to operate the RF communication systems of FIG. 2, in accordance with some embodiments of the inventive concepts disclosed herein.

FIG. 7 illustrates a flow chart of an exemplary method 700 to operate an RF communication system. In accordance with some embodiments of the present disclosure, the method 700 may be performed by the respective components of the RF communication system 200 discussed with respect to FIG. 2. For purposes of discussion, the following embodiment of the method 700 will be described in conjunction with FIG. 2. The illustrated embodiment of the method 700 is merely an example. Therefore, it should be understood that any of a variety of operations may be omitted, re-sequenced, and/or added while remaining within the scope of the present disclosure.

In brief overview, multiple pairs of antennas can receive an RF signal at operation 702. At operation 704, one or more filters, coupled to a respective pair of antennas, may filter received signals. At operation 706, one or more time delay units (TDUs), coupled to the respective pair of antennas, can modify a time delay and/or power gain of at least one of the filtered signals. At operation 708, a subtractor, coupled to the respective pair of antennas, can combine modified signals. At operation 710, a control circuit, coupled to the respective pair of antennas, can determine whether the modified signals are aligned. If not, the method 700 may proceed again to operation 706; but if so, the method 700 proceeds to operation 712 in which the subtractor can generate a plurality of (spatial) nulls at a respective band. At operation 714, a combiner can combine output signals from respective subtractors. At operation 716, the combiner can provide a combined signal, which can contain the plurality of nulls at respective bands, to a receiver.

Referring still to FIG. 7, and in greater detail, the multiple pairs of antennas can receive the RF signal at operation 702. Using the RF communication system 200 of FIG. 2 as an example, the pair of antennas 212 and 214 and the pair of antennas 232 and 234 can respectively receive the RF signal 254. The pair of antennas 212 and 214 may be physically separated apart from each other by distance 227; and the pair of antennas 232 and 234 may be physically separated apart from each other by distance 247. The distances 227 and 247 can be each associated with one or more characteristics (e.g., a wavelength) of the RF signal 254. In some embodiments, the antennas 212 and 214 may be referred to as a part of the antenna portion 210; and the antennas 232 and 234 may be referred to as a part of the antenna portion 230.

At operation 704, the one or more filters, coupled to the respective pair of antennas, may filter the received signals. In response to receiving the RF signal, the one or more filters may each use a respective frequency range (or band) to allow a portion of the signal received by the respective pair of antennas to pass therethrough. The one or more filters can be referred to as frequency filters. Continuing with the example of FIG. 2, the filters 216 and 218, respectively coupled to the antennas 212 and 214, can filter the signals respectively received by the antennas 212 and 214; and the filters 236 and 238, respectively coupled to the antennas 232 and 234, can filter the signals respectively received by the antennas 232 and 234. In some embodiments, the filters 216 and 218 may filter out the portions of the received signals (e.g., 256 and 258) that are outside the band 1, and leave the portions of the received signals that are within the band 1; and filters 236 and 238 may filter out the portions of the received signals that are outside the band 2, and leave the portions of the received signals that are within the band 2. In some embodiments, the bands 1 and 2 may be referred to respective different frequency ranges.

At operation 706, the one or more time delay units (TDUs), coupled to the respective pair of antennas, can modify the time delay and/or power gain of at least one of the filtered signals. In response to the one or more filters filtering the respective received signals, one or more TDUs can modify the filtered signals by applying dynamically configurable time delays and/or power gains on the filtered signals. Using the example of FIG. 2 again, the TDUs 220 and 222 can apply dynamically configurable time delays and/or power gains on the signals that are respectively filtered (e.g., allowed to pass) by the filters 216 and 218; and the TDUs 240 and 242 can apply dynamically configurable time delays and/or power gains on the signals that are respectively filtered (e.g., allowed to pass) by the filters 236 and 238.

At operation 708, the subtractor, coupled to the respective pair of antennas, can combine modified signals. In response to the one or more TDUs modifying the received signals, the subtractor can combine (e.g., subtract) the modified signals to generate an output signal. Using the example of FIG. 2 again, the subtractor 226 can combine (e.g., subtract) the signals respectively modified by the TDUs 220 and 222 to generate an output signal; and the subtractor 246 can combine (e.g., subtract) the signals respectively modified by the TDUs 240 and 242 to generate an output signal.

At operation 710, the control circuit, coupled to the respective pair of antennas, can determine whether the modified signals are aligned. In response to the generation of the output signal, the control circuit can determine whether the modified signals are aligned in time and power levels by monitoring or detecting whether a power level of the output signal has reach a minimum. In some embodiments, the control circuit can iteratively adjust the time delays and/or power gains that the one or more TDUs apply on the respective filtered signals until the control circuit has detected a minimum of the power levels of the output signal over a number of iterations.

Continuing with the example of FIG. 2, the control circuit 224 can iteratively adjust the time delays and/or power gains that the TDUs 220 and 222 apply on the respective signals, filtered by the filters 216 and 218, until the control circuit 224 has detected a minimum of the power levels of the output signal 264 over a number of iterations; and the control circuit 244 can iteratively adjust the time delays and/or power gains that the TDUs 240 and 242 apply on the respective signals, filtered by the filters 236 and 238, until the control circuit 244 has detected a minimum of the power levels of the output signal 266 over a number of iterations.

If the control circuit cannot determine a minimum of the power level at a current iteration, the control circuit can update the time delay(s) and/or power gain(s) that the one or more TDUs apply on the filtered signals (operation 706). If the control circuit can determine a minimum of the power level at the current iteration, the subtractor can provide the output signal, generated by combining the modified signals, as a plurality of nulls at the respective band (operation 712).

At operation 714, the combiner can combine the output signals from the respective subtractors. Using the above example again, the combiner 250 can combine the output signals 264 and 266 provided by the subtractors 226 and 246, respectively. At operation 716, the combiner can provide the one or more nulls at respective bands to the receiver. Continuing with the example of FIG. 2, the combiner 250 may provide the output signal 268 to the receiver, which can be an RF front end 252, during each time of the iterations. As the control circuits 224 and 244 can iteratively update the time delays and/or power gains that the TDUs apply on the filtered signals, the output signals 264 and 266 respectively provided over the plural iterations can include a plurality of nulls at respective bands. In other words, a first plurality of nulls at a first band can be included in the output signal 264; and a second plurality of nulls at a second band can be included in the output signal 266. Upon receiving the output signals 264 and 266, the RF front end can use such nulls, included in the output signals 264 and 266, to eliminate or minimize known or unknown interferences at respective bands.

FIG. 8 illustrates a flow chart of an exemplary method 800 to operate an RF communication system. In accordance with some embodiments of the present disclosure, the method 800 may be performed by the respective components of the RF communication system 300 discussed with respect to FIG. 3. For purposes of discussion, the following embodiment of the method 800 will be described in conjunction with FIG. 3. The illustrated embodiment of the method 800 is merely an example. Therefore, it should be understood that any of a variety of operations may be omitted, re-sequenced, and/or added while remaining within the scope of the present disclosure.

In brief overview, a pair of antennas can receive an RF signal at operation 802. At operation 804, a pair of splitters can route received signals. At operation 806, one or more filters can filter respective routed signals. At operation 808, one or more time delay units (TDUs) can modify a time delay and/or power gain of at least one of the filtered signals. At operation 810, a subtractor, coupled to respective filters, can combine modified signals. At operation 812, a control circuit, coupled to the respective filters, can determine whether the modified signals are aligned. If not, the method 800 may proceed again to operation 808; but if so, the method 800 proceeds to operation 814 in which the subtractor can generate a plurality of nulls at a respective band. At operation 816, a combiner can combine output signals from respective subtractors. At operation 818, the combiner can provide a combined signal, which can contain the plurality of nulls at respective bands, to a receiver.

Referring still to FIG. 8, and in greater detail, the pair of antennas can receive an RF signal at operation 802. Using the RF communication system 300 of FIG. 3 as an example, the pair of antennas 302 and 304 can respectively receive the RF signal 350. The pair of antennas 302 and 304 may be physically separated apart from each other by distance 303. The distance 303 can be each associated with one or more characteristics (e.g., a wavelength) of the RF signal 350.

At operation 804, the pair of splitters can route received signals. Using the above example of FIG. 3 again, the splitter 306 can route the signal 352 received by the antenna 302 by dividing the signal 352 into routed signals 352-1 and 352-2 and forward the signals 352-1 and 352-2 to the nulling portions 310 and 330, respectively; and the splitter 308 can route the signal 354 received by the antenna 304 by dividing the signal 354 into routed signals 354-1 and 354-2 and forward the signals 354-1 and 354-2 to the nulling portions 310 and 330, respectively.

At operation 806, the one or more filters can filter the respective routed signals. In response to receiving the routed signal, the one or more filters at each nulling portion may each use a respective frequency range (or band) to allow a portion of the routed signal to pass therethrough. Continuing with the example of FIG. 3, the filters 312 and 314 at the nulling portion 310 can filter the signals respectively routed by the splitters 306 and 308; and the filters 332 and 334 at the nulling portion 330 can filter the signals respectively routed by the splitters 306 and 308. In some embodiments, the filters 312 and 314 may filter out the portions of the routed signals (e.g., 352-1 and 354-1) that are outside the band 1, and leave the portions of the routed signals that are within the band 1; and filters 332 and 334 may filter out the portions of the routed signals (e.g., 652-2 and 354-2) that are outside the band 2, and leave the portions of the received signals that are within the band 2. In some embodiments, the bands 1 and 2 may be referred to respective different frequency ranges.

At operation 808, the one or more time delay units (TDUs) can modify the time delay and/or power gain of at least one of the filtered signals. In response to the one or more filters filtering the respective received signals, one or more TDUs can modify the filtered signals by applying dynamically configurable time delays and/or power gains on the filtered signals. Using the example of FIG. 3 again, the TDUs 316 and 318 can apply dynamically configurable time delays and/or power gains on the signals that are respectively filtered (e.g., allowed to pass) by the filters 310 and 314; and the TDUs 336 and 338 can apply dynamically configurable time delays and/or power gains on the signals that are respectively filtered (e.g., allowed to pass) by the filters 332 and 334.

At operation 810, the subtractor, coupled to the respective filters, can combine modified signals. In response to the one or more TDUs modifying the received signals, the subtractor can combine (e.g., subtract) the modified signals to generate an output signal. Using the example of FIG. 3 again, the subtractor 322 can combine (e.g., subtract) the signals respectively modified by the TDUs 316 and 318 to generate an output signal; and the subtractor 342 can combine (e.g., subtract) the signals respectively modified by the TDUs 336 and 338 to generate an output signal.

At operation 812, the control circuit, coupled to the respective filters, can determine whether the modified signals are aligned. In response to the generation of the output signal, the control circuit can determine whether the modified signals are aligned in time and power levels by monitoring or detecting whether a power level of the output signal has reach a minimum. In some embodiments, the control circuit can iteratively adjust the time delays and/or power gains that the one or more TDUs apply on the respective filtered signals until the control circuit has detected a minimum of the power levels of the output signal over a number of iterations.

Continuing with the example of FIG. 3, the control circuit 320 can iteratively adjust the time delays and/or power gains that the TDUs 316 and 318 apply on the respective signals, filtered by the filters 312 and 314, until the control circuit 320 has detected a minimum of the power levels of the output signal 356 over a number of iterations; and the control circuit 340 can iteratively adjust the time delays and/or power gains that the TDUs 336 and 338 apply on the respective signals, filtered by the filters 332 and 334, until the control circuit 340 has detected a minimum of the power levels of the output signal 266 over a number of iterations.

If the control circuit cannot determine a minimum of the power level at a current iteration, the control circuit can update the time delay(s) and/or power gain(s) that the one or more TDUs apply on the filtered signals (operation 808). If the control circuit can determine a minimum of the power level at the current iteration, the subtractor can provide the output signal, generated by combining the modified signals, as a plurality of nulls at the respective band (operation 814).

At operation 816, the combiner can combine the output signals from the respective subtractors. Using the above example again, the combiner 344 can combine the output signals 356 and 358 provided by the subtractors 322 and 342, respectively. At operation 818, the combiner can provide the plurality of nulls at respective bands to the receiver. Continuing with the example of FIG. 3, the combiner 344 may provide the output signal 360 to the receiver, which can be an RF front end 346, during each time of the iterations. As the control circuits 320 and 340 can iteratively update the time delays and/or power gains that the TDUs apply on the filtered signals, at least one of the output signals 356 and 358 respectively provided over the plural iterations can include a null at a respective band. The RF front end can use such a null to eliminate or minimize a known or an unknown interference.

C. Nulls Generated by RF Communication Systems

Figure 9A:
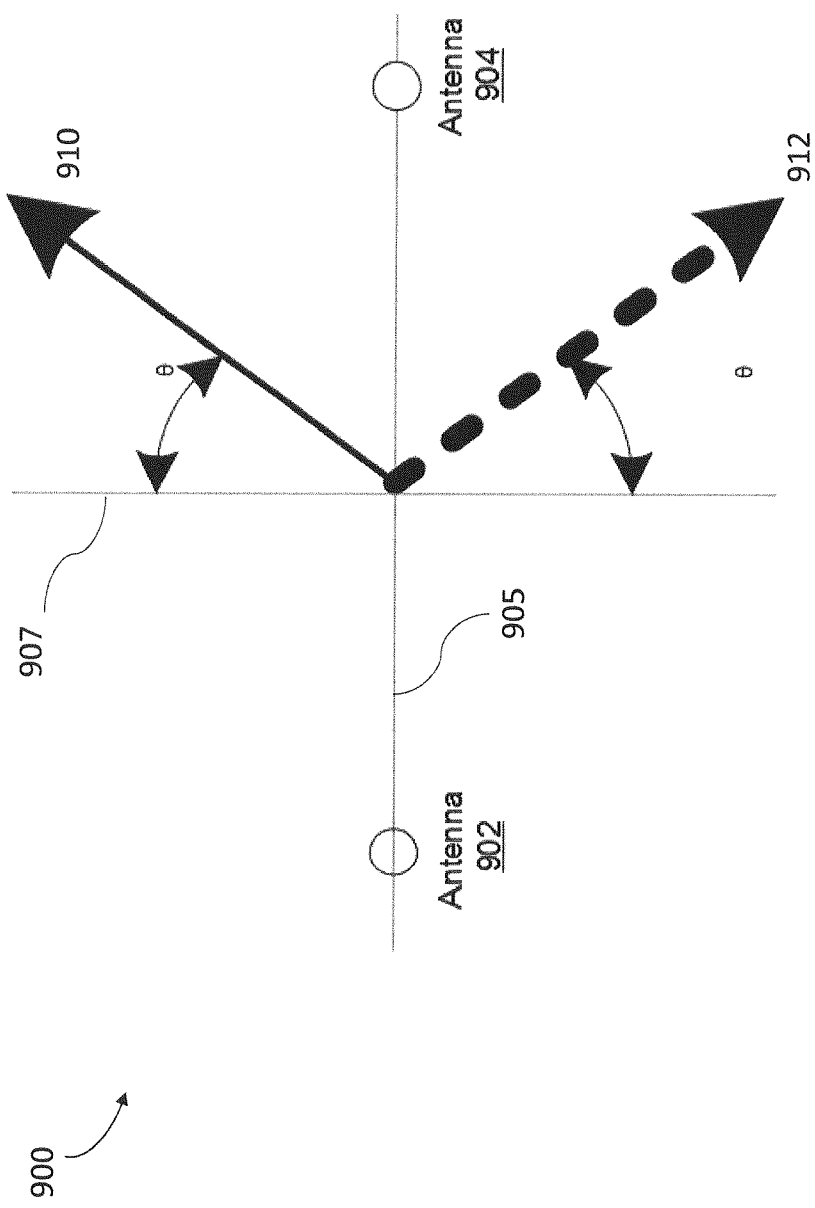
FIG. 9A shows a symbolic diagram of nulls, in accordance with some embodiments of the inventive concepts disclosed herein.
Figure 9B:
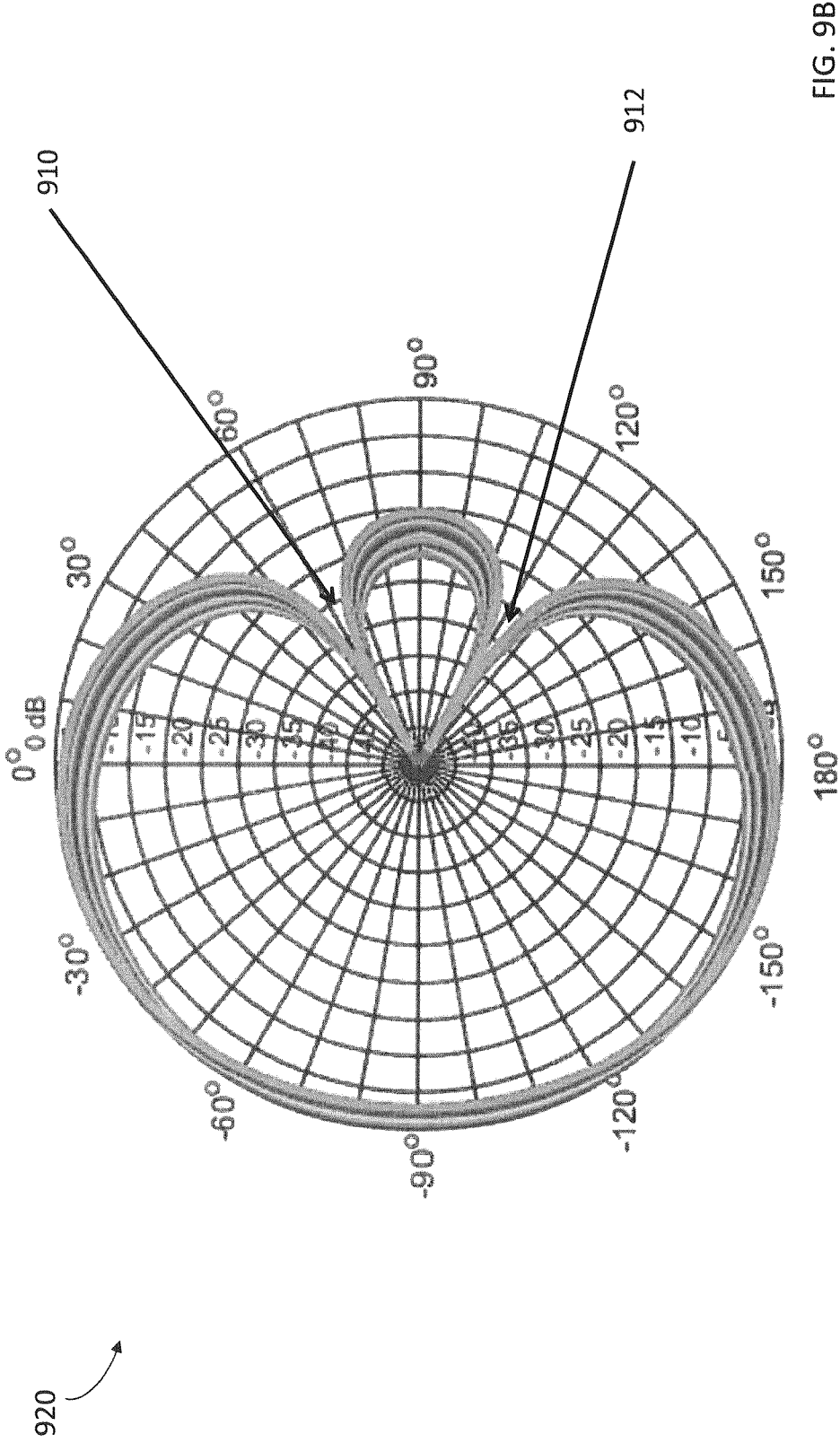
FIG. 9B shows an antenna polar plot corresponding to the symbolic diagram of FIG. 9A, in accordance with some embodiments of the inventive concepts disclosed herein.

Referring to FIGS. 9A and 9B, a symbolic diagram 900 of exemplary nulls and a corresponding antenna polar plot 920 of the exemplary nulls are depicted, respectively. As shown in the illustrated embodiment of FIG. 9A, a pair of antennas 902 and 904 can be arranged along an axis 905. The pair of antennas 902 and 904 can be a part of one of the above-discussed RF communication systems (e.g., 100, 130, 160, 200, 300, 400, and 500) that are configured to receive one or more RF signals. In some embodiments, each of the antennas 902 and 904 can be an omnidirectional antenna.

By performing the nulling function discussed above, a null 910, and a null 912 symmetrically mirrored from the null 910 over the axis 905 can be both generated, in accordance with some embodiments of the present disclosure. For example, the null 910 can be tilted from an axis 907, substantially perpendicular to the axis 905, by an angle θ, while the null 912 can be tilted from the axis 907 by the same angle θ. In some embodiments, the null 912 can be referred to as a symmetric or sympathetic null with respect to the null 910.

Referring to FIG. 9B, the antenna polar plot 920, corresponding to the symbolic diagram 900 of FIG. 9A, is illustrated. As shown in FIG. 9B, the respective power levels (in the unit of dB) of null 910 and symbolic null 912 can each present a minimum on the antenna polar plot 920, and each of the minimum power levels can be aligned along a certain direction with respect to the antennas 902 and 904. As discussed above, each of the disclosed RF communication systems can utilize the nulls to eliminate or minimize interferences, for example, adjusting the direction along which the null is aligned to be aligned with a source of the interference.

In some embodiments, the spacing (e.g., 115, 135, 177, 227, 247, 303, 505, and 545) between a pair of antennas of the disclosed RF communication system can be adjusted to be greater than a half of the wavelength of the RF signal received by the antennas. As such, one or more aliased nulls, as mentioned above, can be generated by the disclosed RF communication systems.

Figure 10:
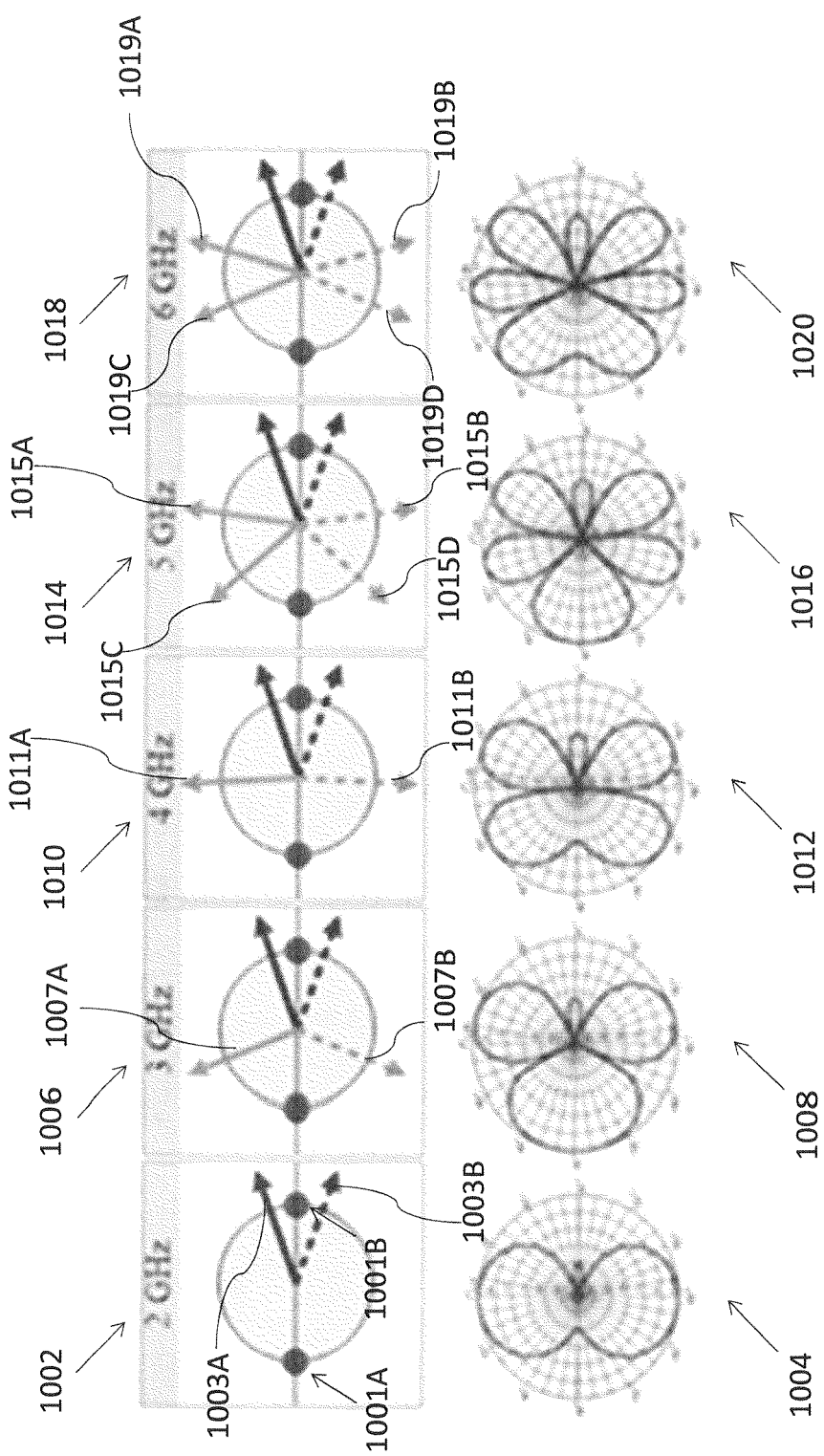
FIG. 10 shows various symbolic diagrams and corresponding antenna polar plots of nulls and/or aliased nulls, in accordance with some embodiments of the inventive concepts disclosed herein.

FIG. 10 illustrates a number of exemplary symbolic diagrams of nulls and/or aliased nulls with respect to a pair of antennas 1001A and 1001B, and corresponding antenna polar plots. In some embodiments, the antennas 1001A and 1001B may be separated from each other by a fixed distance. The distance can be associated with the wavelength of the RF signal received by the antenna 1001A and 1001B (e.g., quantized by the wavelength). When the frequency of the RF signal (reciprocal to the wavelength) varies, quantized weights of the distance may vary. When the quantized weight of the distance becomes greater than ½ (i.e., the distance between antennas 1001A and 1001B, when expressed in wavelength, is greater than ½ wavelength), in some embodiments, the one or more aliased nulls can be generated by the disclosed RF communication systems. In some embodiments, the disclosed RF communication system can perform the nulling function to adjust the time delays that the respective TDUs use, thereby causing a certain range of time delays to include more RF cycles. In response to including more RF cycles, the RF communication system can generate more aliased nulls accordingly.

For example, when the frequency of the RF signal is about 2 GHz, a pair of nulls 1003A and 1003B can be generated by a currently disclosed RF communication system that includes the antennas 1001A and 1001B, which can be seen in the symbolic diagram 1002 and corresponding antenna polar plot 1004. As the frequency of the RF signal becomes about 3 GHz, a pair of aliased nulls 1007A and 1007B can be generated, which can be seen in the symbolic diagram 1006 and corresponding antenna polar plot 1008. As the frequency of the RF signal becomes about 4 GHz, a pair of aliased nulls 1011A and 1011B (along with different directions than the aliased nulls 1007A-B) can be generated, which can be seen in the symbolic diagram 1010 and corresponding antenna polar plot 1012. As the frequency of the RF signal becomes about 5 GHz, two pairs of aliased nulls 1015A and 1015B and 1015C and 1015D can be generated, which can be seen in the symbolic diagram 1014 and corresponding antenna polar plot 1016. As the frequency of the RF signal becomes about 6 GHz, two pairs of aliased nulls 1019A and 1019B and 1019C and 1019D can be generated, which can be seen in the symbolic diagram 1018 and corresponding antenna polar plot 1020.

Figure 11B:
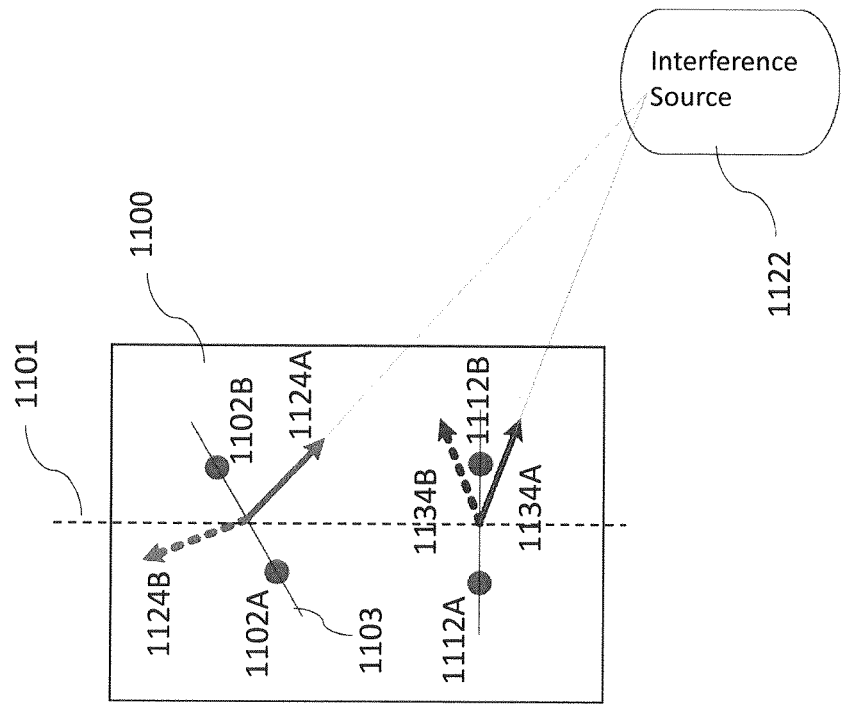
FIGS. 11A and 11B show symbolic diagrams of overlapped and non-overlapped nulls, respectively, in accordance with some embodiments of the inventive concepts disclosed herein
Figure 11A:
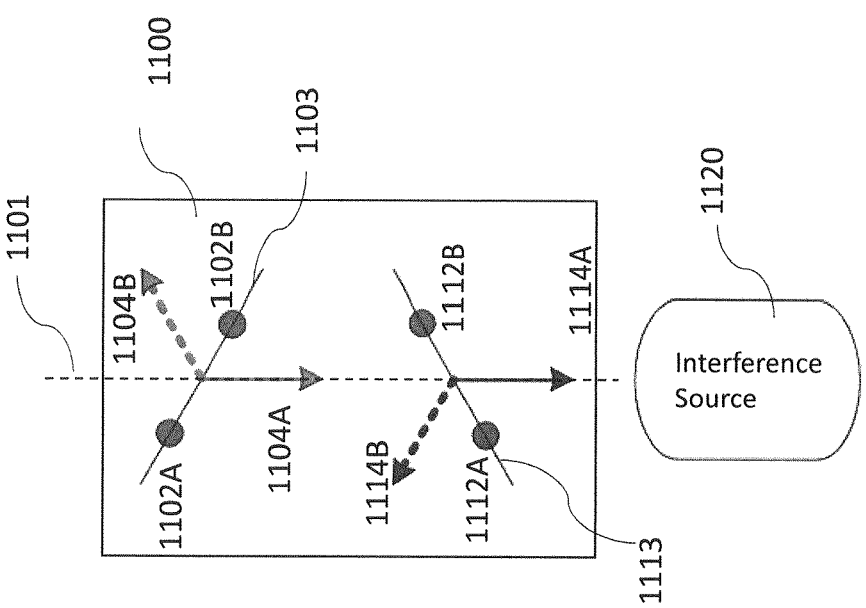

FIGS. 11A and 11B respectively illustrates examples in which the directions of nulls generated with respect to two different pairs of antennas can be adjusted, in accordance with some embodiments of the present disclosure. Referring first to FIG. 11A, an RF communication system 1100 can include a first pair of antennas 1104A-B and a second pair of antennas 1114A-1114B. The RF communication system 1100 can be deployed on a device (e.g., a vehicle), which may move along a direction 1101 in the illustrated embodiment of FIG. 11A. On or in the device, the first pair of antennas 1102A-B can be deployed along an axis 1103, and the second pair of antennas 1112A-B can be deployed along an axis 1113. The axis 1103 can be aligned along a direction either different from or similar to the direction along which the axis 1113 extends.

By performing the above-discussed nulling function, the RF communication system 1100 can generate a pair of nulls 1104A-B with respect to the antennas 1102A-B, and a pair of nulls 1114A-B with respect to the antennas 1112A-B. In a case where an interference source 1120 is located along the direction 1101, the RF communication system can align or overlap the directions of null 1104A and 1114A to eliminate or minimize the interference by performing the nulling function and/or adjusting the directions of axis 1103 and axis 1113.

FIG. 11B illustrates another example in which an interference source 1122 is located away from the direction 1101. To eliminate or minimize the interference, the RF communication system 1100 can generate another pair of nulls 1124A-B with respect to the antennas 1102A-B by performing the nulling function and/or adjusting the direction of axis 1103, and another pair of nulls 1134A-B with respect to the antennas 1112A-B by performing the nulling function and/or adjusting the direction of axis 1113. As such, at least two of the nulls (e.g., 1124A and 1134A in FIG. 11B) can be combined to be aligned with the interference source 1122, even though no nulls are overlapped.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for cancelling interference, the system comprising:
   a first antenna;
   a second antenna spatially separated from the first antenna;
   a first time delay unit, coupled to the first antenna, and configured to apply a first time delay and first power gain on a first signal received by the first antenna to provide a modified version of the first signal;
   a third antenna;
   a fourth antenna spatially separated from the third antenna;
   a second time delay unit, coupled to the third antenna, and configured to apply a second time delay and second power gain on a second signal received by the third antenna to provide a modified version of the second signal;
   a processor, coupled to the first time delay unit, and configured to determine the first time delay and first power gain to cause the modified version of the first signal and a third signal received by the second antenna to be aligned in time and power level, wherein the processor is further coupled to the second time delay unit and is configured to determine the second time delay and second power gain to cause the modified version of the second signal and a fourth signal received by the fourth antenna to be aligned in time and a power level;
a first subtractor configured to subtract respective power levels of the modified version of the first signal and the third signal to provide a first output signal, wherein the first output signal provides at least a first null; and
a second subtractor configured to subtract respective power levels of the modified version of the second signal and the fourth signal to provide a second output signal, wherein the second output signal provides at least a second null, and wherein the first null and the second null are symmetrically mirrored by an axis connecting the first and second antennas.

2. The system of claim 1, wherein the processor is coupled to the first and second subtractor and is configured to use the first and second output signal to determine the first time delay and first power gain and the second time delay and second gain, respectively.

3. The system of claim 1, further comprising:
a first frequency filter coupled between the first antenna and first time delay unit; and
a second frequency filter coupled between the third antenna and second time delay unit,
wherein the first and second frequency filters are configured to allow a signal within a first frequency range to pass therethrough.

4. The system of claim 1, further comprising:
a mutual coupling mitigation circuit, coupled between the first and second antennas and the first time delay unit, and configured to substantially reduce a power level of an interference signal received by one of the first and second antennas and re-radiated from the other of the first and second antennas.

5. A system for automatically cancelling interference, the system comprising:
a first antenna;
a second antenna spatially separated from the first antenna;
a first time delay unit configured to apply a first time delay and first power gain on a first signal received by the first antenna to provide a modified version of the first signal;
a third antenna;
a fourth antenna spatially separated from the third antenna;
a second time delay unit configured to apply a second time delay and second power gain on a second signal received by the third antenna to provide a modified version of the second signal;
a first frequency filter coupled between the first antenna and first time delay unit;
a second frequency filter coupled between the second antenna and second time delay unit,
wherein the first and second frequency filters are configured to allow a signal within a first frequency range to pass therethrough;
a first combiner configured to combine the modified version of the first signal and a third signal provided from the second antenna;
a second combiner configured to combine the modified version of the second signal and a fourth signal provided from the fourth antenna;
a third frequency filter coupled between the second antenna and first combiner;
a fourth frequency filter coupled between the fourth antenna and second combiner,
wherein the third and fourth frequency filters are configured to allow a signal within a second frequency range to pass therethrough; and
a control circuit configured to determine the first and second time delays and first and second power gains to cause the modified version of the first signal and the third signal to be aligned in time and power levels and the modified version of the second signal and the fourth signal to be aligned in time and power levels, wherein the control circuit is further configured to determine a power level of a first output signal received from the first combiner and a power level of a second output signal received from the second combiner, wherein the first output signal provides at least a first null and a second null and the second output signal provides at least a third null and a fourth null, wherein the first and second nulls are symmetrically mirrored by a first axis connecting the first and second antennas, and wherein the third and fourth nulls are symmetrically mirrored by a second axis connecting the third and fourth antennas.

6. The system of claim 5, wherein the first frequency range is different from the second frequency range.

7. The system of claim 5, wherein at least one of the first or second nulls and at least one of the third or fourth nulls are aligned along a same direction, or none of the first, second, third, or fourth nulls is aligned along a same direction.

8. A system for automatically cancelling interference, the system comprising:
a first antenna;
a second antenna spatially separated from the first antenna;
a first time delay unit configured to apply a first time delay and first power gain on a first signal received by the first antenna to provide a first modified version of the first signal;
a second time delay unit configured to apply a second time delay and second power gain on a second signal received by the second antenna to provide a second modified version of the second signal;
a third antenna;
a fourth antenna spatially separated from the third antenna;
a third time delay unit configured to apply a third time delay and third power gain on a third signal received by the third antenna to provide a third modified version of the third signal;
a fourth time delay unit configured to apply a fourth time delay and fourth power gain on a fourth signal received by the fourth antenna to provide a fourth modified version of the fourth signal;
a first subtractor configured to subtract respective power levels of the first modified version of the first signal and the second modified version of the second signal to provide a first output signal;
a first control circuit configured to determine the first and second time delays and first and second power gains based on a power level of the first output signal to cause the first modified version of the first signal and the second modified version of the second signal to be aligned in time and power levels;
a second subtractor configured to subtract respective power levels of the third modified version of the third signal and the fourth modified version of the fourth signal to provide a second output signal; and
a second control circuit configured to determine the third and fourth time delays and third and fourth power gains based on a power level of the second output signal to cause the third modified version of the third signal and the fourth modified version of the fourth signal to be aligned in time and power levels.

9. The system of claim 8, further comprising:

a first frequency filter configured to allow the first signal, routed by a first splitter, to pass therethrough to be received by the first time delay unit, responsive to the first signal being within a first frequency range;

a second frequency filter configured to allow the second signal, routed by a second splitter, to pass therethrough to be received by the second time delay unit, responsive to the second signal being within the first frequency range;

a third frequency filter configured to allow the first signal, routed by the first splitter, to pass therethrough to be received by the third time delay unit, responsive to the first signal being within a second frequency range; and a fourth frequency filter configured to allow the second signal, routed by the second splitter, to pass therethrough to be received by the fourth time delay unit, responsive to the second signal being within the second frequency range.

10. The system of claim 9, wherein the first frequency range is different from the second frequency range.

11. The system of claim 8, further comprising:

a combiner configured to combine the first and second output signals to provide a single output signal for a receiver.

12. The system of claim 8, wherein the first output signal provides at least a first null and a second null and the second output signal provides at least a third null and a fourth null, the first and second nulls being symmetrically mirrored by an axis connecting the first and second antennas and third and fourth nulls being symmetrically mirrored by the axis connecting the first and second antennas.

13. The system of claim 12, wherein at least one of the first or second nulls and at least one of the third or fourth nulls are aligned along a same direction, or none of the first, second, third, or fourth nulls is aligned along a same direction.

* * * * *